(12) United States Patent
Ko et al.

(10) Patent No.: US 11,653,377 B2
(45) Date of Patent: May 16, 2023

(54) METHOD FOR SIGNALING CONTROL INFORMATION FOR COORDINATED MULTIPOINT TRANSMISSION IN WIRELESS COMMUNICATION SYSTEM

(71) Applicant: Electronics and Telecommunications Research Institute, Daejeon (KR)

(72) Inventors: Young Jo Ko, Daejeon (KR); Jae Young Ahn, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 14/438,975

(22) PCT Filed: Sep. 26, 2013

(86) PCT No.: PCT/KR2013/008635
§ 371 (c)(1),
(2) Date: Apr. 28, 2015

(87) PCT Pub. No.: WO2014/051356
PCT Pub. Date: Apr. 3, 2014

(65) Prior Publication Data
US 2015/0312927 A1 Oct. 29, 2015

(30) Foreign Application Priority Data

Sep. 27, 2012 (KR) .......... 10-2012-0107619
Oct. 5, 2012 (KR) .......... 10-2012-0110777
(Continued)

(51) Int. Cl.
*H04W 72/12* (2009.01)
*H04B 7/024* (2017.01)
(Continued)

(52) U.S. Cl.
CPC ........ *H04W 72/1231* (2013.01); *H04B 7/024* (2013.01); *H04B 7/0626* (2013.01);
(Continued)

(58) Field of Classification Search
None
See application file for complete search history.

(56) References Cited

U.S. PATENT DOCUMENTS 8,208,434 B2  6/2012  Sayan et al.
8,274,951 B2  9/2012  Liu et al.
(Continued)

FOREIGN PATENT DOCUMENTS

KR  10-2015-0058175 A  5/2015
WO  2012/108679 A2  8/2012
WO  2014/022209 A1  2/2014

OTHER PUBLICATIONS

Alcatel-Lucent et al., "Downlink Control Signalling for CoMP", R1-122487, 3GPP TSG RAN WG1 Meeting #69, Prague, Czech, May 21-25, 2012.
(Continued)

*Primary Examiner* — Adnan Baig

(57) ABSTRACT

Disclosed is a method for signaling control information for coordinated multipoint (CoMP) transmission in a wireless communication system. The control information signaling method for CoMP transmission is performed by a base station and comprises providing, through RRC signaling, a terminal with setup information on each CSI-RS resource of a CoMP measurement group which is set in the terminal; and selectively providing, through DCI, the terminal with control information which indicates mapping of the PDSCH resource element corresponding to terminal and at least either pseudo-same positionality information of CSI-RS or pseudo-same positionality information of DM-RS. Thus,
(Continued)

control information signaling for coordinated multipoint transmission can be efficiently performed.

31 Claims, 5 Drawing Sheets

(30) Foreign Application Priority Data

| | | |
|---|---|---|
| Oct. 8, 2012 | (KR) | 10-2012-0111108 |
| Oct. 30, 2012 | (KR) | 10-2012-0121250 |
| Nov. 1, 2012 | (KR) | 10-2012-0122812 |
| Sep. 26, 2013 | (KR) | 10-2013-0114172 |

(51) Int. Cl.
*H04L 5/00* (2006.01)
*H04B 7/06* (2006.01)
*H04W 72/1273* (2023.01)

(52) U.S. Cl.
CPC ............ *H04L 5/005* (2013.01); *H04L 5/0035* (2013.01); *H04L 5/0094* (2013.01); *H04W 72/1273* (2013.01); *H04W 72/1294* (2013.01); *H04L 5/0051* (2013.01)

(56) References Cited

U.S. PATENT DOCUMENTS

| 8,842,622 | B2* | 9/2014 | Zhang | H04B 7/024 |
| | | | | 370/203 |
| 9,603,139 | B2 | 3/2017 | Lee et al. | |
| 2013/0003788 | A1* | 1/2013 | Marinier | H04B 7/0626 |
| | | | | 375/219 |
| 2013/0039284 | A1* | 2/2013 | Marinier | H04L 5/001 |
| | | | | 370/329 |
| 2013/0114428 | A1* | 5/2013 | Koivisto | H04B 7/0691 |
| | | | | 370/312 |
| 2013/0279361 | A1* | 10/2013 | Seo | H04W 24/10 |
| | | | | 370/252 |
| 2013/0301434 | A1* | 11/2013 | Krishnamurthy | H04L 1/0026 |
| | | | | 370/252 |
| 2013/0301467 | A1* | 11/2013 | Kang | H04B 7/024 |
| | | | | 370/252 |
| 2013/0343317 | A1* | 12/2013 | Etemad | H04B 7/024 |
| | | | | 370/328 |
| 2014/0036747 | A1* | 2/2014 | Nory | H04W 72/0406 |
| | | | | 370/336 |
| 2014/0133427 | A1* | 5/2014 | Kim | H04L 5/0053 |
| | | | | 370/329 |

OTHER PUBLICATIONS

Huawei et al., "Discussion on antenna ports collocation", R1-123124, 3GPP TSG RAN WG1 Meeting #70, Qingdao, China, Aug. 13-17, 2012.

Samsung, "Remaining issues on quasi co-location of antenna ports", R1-123493, 3GPP TSG-RAN WG1#70 meeting, Qingdao, P.R. China, Aug. 13-17, 2012.

* cited by examiner

METHOD FOR SIGNALING CONTROL INFORMATION FOR COORDINATED MULTIPOINT TRANSMISSION IN WIRELESS COMMUNICATION SYSTEM

TECHNICAL FIELD

The present invention relates to a wireless communication system, and more particularly, to a control signaling method for coordinated multipoint (CoMP) communication in a wireless communication system including a plurality of transmission points (TPs) separated from each other.

BACKGROUND ART

With the tendency of ultrahigh speed of wireless communication systems, the standardization of CoMP transmission/reception methods for $3^{rd}$ generation project partnership (3GPP) long term evolution-advanced (LTE-A) systems which are fourth generation mobile communication systems is in progress.

The CoMP transmission/reception method indicates transmission/reception operations between two or more TPs (for example, sites, cells, base stations, distributed antennas, or the like) and one or more terminals. The CoMP transmission/reception method may be divided into downlink CoMP transmission and uplink CoMP reception.

The downlink CoMP transmission is a method in which a plurality of points geographically apart from each other cooperatively transmit signals to one or more terminals. The downlink CoMP transmission method may be roughly divided into joint processing ((hereinafter abbreviated as "JP") and coordinated scheduling/beamforming (hereinafter abbreviated as "CS/CB").

In the JP, a large number of TPs geographically apart from each other share data to be transmitted to the terminal and transmit the shared data. The JP is divided into joint transmission (JT) and dynamic point selection (DPS) in detail.

The JT is a method in which a large number of TPs simultaneously transmit the same data to the terminal using the same resource. The DPS is a method in which one TP transmits data at a specific time point and the TP may dynamically change.

On the other hand, a representative scheme of JP CoMP is coherent transmission of multiple TPs based on a TP-specific codebook. The scheme of coherent transmission of multiple TPs is a method in which beamforming is attempted in units of TPs joining the JP and a phase of each beam is additionally corrected so that phases of different beams reaching from multiple TPs are enhanced to overlap each other.

The CS/CB is a transmission method in which only one TP transmits data at a specific moment to reduce interference affecting a terminal located in a transmission region boundary of TPs through scheduling and cooperation for beamforming with neighboring TPs. Further, the CS/CB includes mutual cooperation of beamforming having a spatial degree of freedom (DoF) in cooperation of a transmission power dimension standardized in the 3GPP LTE standard, Release 8.

The uplink CoMP reception method is a method in which a plurality of reception points (RPs) geographically apart from each other receives a signal transmitted from a predetermined terminal, and may be divided into joint reception (JR) and CS/CB.

The JR is a scheme of receiving a physical uplink shared channel (PUSCH) and a physical uplink control channel (PUCCH) in a plurality of RPs.

The CS/CB is a scheme in which a plurality of RPs cooperatively perform scheduling and pre-coding and a terminal transmits data for one RP.

On the other hand, mapping information of an resource element (RE) of a channel including corresponding data should be known so that a terminal demodulates data received from at least one TP through various CoMP transmission/reception methods described above normally.

In addition, resource information of a reference signal to be used by TPs joining data transmission should be able to be known to improve data reception performance of a terminal in a CoMP transmission/reception environment.

Accordingly, it is necessary to signal information about a reference signal (RS) to be used by at least one TP joining transmission in the CoMP transmission/reception environment and mapping information about an RE used in data transmission to a corresponding terminal. For this, a specific signaling method for control information is required.

DISCLOSURE

Technical Problem

An objective of the present invention is to provide a control information signaling method for CoMP transmission capable of improving data reception performance of a terminal and radio resource use efficiency in a wireless multipoint communication environment.

Technical Solution

According to one aspect of the present invention for achieving the aforementioned objective of the present invention, a control information signaling method to be performed in a base station for CoMP transmission includes the steps of: providing a terminal with configuration information about each channel state information reference signal (CSI-RS) resource belonging to a CoMP measurement set in the terminal through radio resource control (RRC) signaling; and selectively providing the terminal with control information indicating at least one of physical downlink shared channel (PDSCH) RE mapping information and quasi co-location information of a CSI-RS and a demodulation reference signal (DM-RS) corresponding to the terminal through downlink control information (DCI).

Here, the step of providing the terminal with the configuration information about each CSI-RS resource belonging to the CoMP measurement set in the terminal through the RRC signaling may include: providing the terminal with at least one of information about the number of cell-specific reference signal (CRS) ports for each CSI-RS resource, information about a frequency shift of a CRS RE, multicast broadcast single frequency network (MBSFN) subframe configuration information, non-zero-power (NZP) CSI-RS resource configuration information, and zero power (ZP) CSI-RS resource configuration information.

Here, the step of selectively providing the terminal with the control information through the DCI may include: selectively providing the terminal with the control information based on at least one of a PDSCH scheduling method, a PDSCH transmission method, and whether a fallback operation is supported when a DCI format and a transmission mode are changed.

Here, the step of selectively providing the terminal with the control information through the DCI may include: excluding, when the DCI is associated with a DM-RS-based PDSCH scheduled according to a DCI format 1A, the control information from the DCI format 1A.

Here, the step of selectively providing the terminal with the control information through the DCI may include: providing, when the DCI is configured in the DCI format 1A, the terminal with resource configuration information of the CSI-RS quasi co-located with the DM-RS through the RRC signaling.

Here, the step of selectively providing the terminal with the control information through the DCI may include: including the control information in a DCI format 2D in DM-RS-based PDSCH transmission scheduled according to the DCI format 2D in which cyclic redundancy check (CRC) of the DCI is scrambled by a cell radio network temporary identifier (C-RNTI).

Here, the step of selectively providing the terminal with the control information through the DCI may include: including the control information in a DCI format 2D for activating semi-persistent scheduling in DM-RS-based PDSCH transmission semi-persistently scheduled according to the DCI format 2D in which CRC of the DCI is scrambled by a semi-persistent scheduling (SPS) C-RNTI.

Here, the step of providing the terminal with the configuration information about each CSI-RS resource belonging to the CoMP measurement set in the terminal through the RRC signaling includes: signaling information about ZP CSI-RS resource configuration information excluded from PDSCH resource mapping for a CRS-based PDSCH to the terminal using information for discriminating information about ZP CSI-RS REs excluded from the PDSCH resource mapping for CRS-based PDSCH transmission and information about ZP CSI-RS REs excluded from the PDSCH resource mapping for DM-RS-based PDSCH transmission from each other when a CRS-based PDSCH is transmitted to the terminal.

Here, the control information signaling method may further include: providing, when the DCI is configured in a DCI format 2D, the terminal with information indicating whether the control information is included in the DCI format 2D through the RRC signaling.

Here, the step of selectively providing the terminal with the control information through the DCI may include: excluding, when the DCI is configured in a DCI format 2D and the number of CSI-RS resources belonging to the CoMP measurement set is one, the control information from the DCI format 2D.

Here, the step of providing the terminal with the configuration information about each CSI-RS resource belonging to the CoMP measurement set in the terminal through the RRC signaling may include: providing the terminal with one predetermined piece of ZP CSI-RS configuration information in CoMP scenario 3.

Here, the step of providing the terminal with the configuration information about each CSI-RS resource belonging to the CoMP measurement set in the terminal through the RRC signaling may include: providing the terminal with one piece of NZP CSI-RS configuration information and one piece of ZP-CSI-RS configuration information regardless of fallback support according to a transmission mode change for transmission modes 1 to 9 through the RRC signaling.

Also, according to another aspect of the present invention for achieving the objective of the present invention, a control information signaling method in an operation method of a terminal which receives control information for CoMP transmission includes the steps of: receiving configuration information about each CSI-RS resource belonging to a CoMP measurement set from a base station through RRC signaling; selectively receiving control information indicating at least one of PDSCH RE mapping information and quasi co-location information of a CSI-RS and a DM-RS corresponding to the terminal from the base station through DCI; and demodulating a PDSCH based on the at least one of the configuration information about each CSI-RS and the control information.

Here, the step of receiving the configuration information about each CSI-RS resource belonging to the CoMP measurement set from the base station through the RRC signaling may include: receiving at least one of information about the number of CRS ports for each CSI-RS resource, information about a frequency shift of a CRS RE, MBSFN subframe configuration information, NZP CSI-RS resource configuration information, and ZP CSI-RS resource configuration information.

Here, the step of receiving the configuration information about each CSI-RS resource belonging to the CoMP measurement set from the base station through the RRC signaling may include: determining, by the terminal, whether the number of CRS ports, a CRS RE frequency shift, and MBSFN subframe configuration information among the CSI-RS resource configuration information which is not received from the base station among CSI-RS resources belonging to the CoMP measurement set are the same as those of configuration information of a serving cell of the terminal.

Here, the step of selectively receiving the control information through the DCI may include: recognizing, by the terminal, a CSI-RS belonging to the CSI-RS resource set included in the control information when the control information is provided and received; and determining that a DM-RS associated with the PDSCH RE is quasi co-located with the recognized CSI-RS.

Here, the step of selectively receiving the control information through the DCI may include: receiving, when the DCI is associated with a DM-RS-based PDSCH scheduled by a DCI format 1A, resource configuration information of the CSI-RS quasi co-located with the DM-RS from the base station through the RRC signaling without receiving the control information through the DCI format 1A.

Here, the step of selectively receiving the control information through the DCI may include: receiving the control information through a DCI format 2D when a DM-RS-based PDSCH scheduled according to the DCI format 2D in which CRC of the DCI is scrambled by a C-RNTI is received.

Here, the step of selectively receiving the control information through the DCI may include: receiving the control information through a DCI format 2D for activating semi-persistent scheduling when a DM-RS-based PDSCH semi-persistently scheduled according to the DCI format 2D in which CRC of the DCI is scrambled by an SPS C-RNTI is received.

Here, the step of receiving the configuration information about each CSI-RS resource belonging to the CoMP measurement set from the base station through the RRC signaling may include: receiving the configuration information from the base station using information for discriminating information about ZP CSI-RS REs excluded from the PDSCH resource mapping for CRS-based PDSCH transmission and information about ZP CSI-RS REs excluded from the PDSCH resource mapping for DM-RS-based PDSCH transmission from each other when a CRS-based PDSCH is received from the base station.

Advantageous Effects

According to a method of signaling control information for CoMP transmission in a wireless communication system, a method of signaling RE mapping information of a physical downlink channel used by at least one TP joining transmission in a CoMP transmission/reception environment and/or information about quasi co-location between RSs is separately provided according to a physical downlink channel scheduling method, a transmission mode set in a terminal, a downlink control information type, a search space in which downlink control information is transmitted, whether an fallback operation is supported when a transmission mode changes, and a search space according to a CoMP scenario.

Accordingly, it is possible to efficiently signal control information for each terminal set in a CoMP transmission mode and improve data reception performance and radio resource use efficiency of the terminal through the efficient signaling.

MODES OF THE INVENTION

Figure 1:
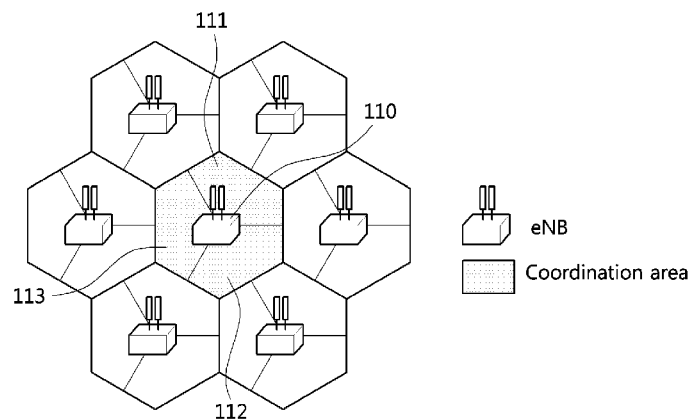
FIG. 1 is a conceptual diagram illustrating CoMP scenario 1.

As the present invention allows for various changes and numerous embodiments, particular embodiments will be illustrated in drawings and described in detail in the written description.

However, this is not intended to limit the present invention to particular modes of practice, and it is to be appreciated that all changes, equivalents, and substitutes that do not depart from the spirit and technical scope of the present invention are encompassed in the present invention.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

The term "terminal" used herein may be referred to as a mobile station (MS), mobile terminal (MT), user equipment (UE), user terminal (UT), wireless terminal, access terminal (AT), subscriber unit, subscriber station (SS), wireless device, wireless communication device, wireless transmit/receive unit (WTRU), mobile node, mobile, or other terms.

The term "base station" used herein generally denotes a fixed point that communicates with the terminal, and may be referred to as a Node-B, evolved Node-B (eNB), base transceiver system (BTS), access point, and other terms.

In addition, the term "TP" used herein denotes a transmitting/receiving apparatus that includes at least one transmitting and receiving antenna and is connected to a base station via an optical fiber, microwaves, or the like and capable of exchanging information with the base station, and may be referred to as a remote radio head (RRH), a remote radio unit (RRU), a site, a distributed antenna, or the like.

In addition, the TP used herein may be referred to as a TP when a signal is transmitted and referred to as a RP when a signal is received.

Hereinafter, preferred embodiments of the present invention will be described in more detail with reference to the accompanying drawings. Hereinafter, the same reference signs in the drawings denote the same elements, and repetitive description of the same elements is omitted.

A CoMP scenario considered in 3GPP is classified into four CoMP scenarios 1, 2, 3, and 4.

CoMP scenario 1 is a homogeneous network in which an intra-site CoMP is enabled.

CoMP scenario 2 is a homogeneous network constituted of a high-power remote radio head (RRH).

CoMP scenario 3 is a heterogeneous network constituted of a macro cell and low-power RRHs, and the RRH has a different cell identity (ID) from the macro cell.

CoMP scenario 4 is a heterogeneous network constituted of a macro cell and low-power RRHs, and the RRH has the same cell ID as macro cell.

Hereinafter, the CoMP scenarios defined in 3GPP will be described with reference to FIGS. 1 to 3.

Figure 2:
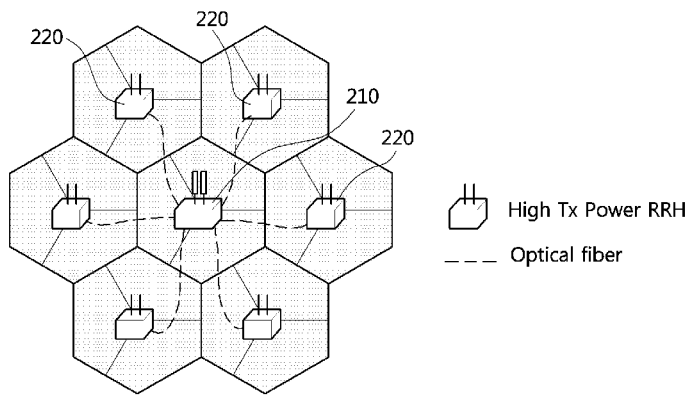
FIG. 2 is a conceptual diagram illustrating CoMP scenario 2.
Figure 3:
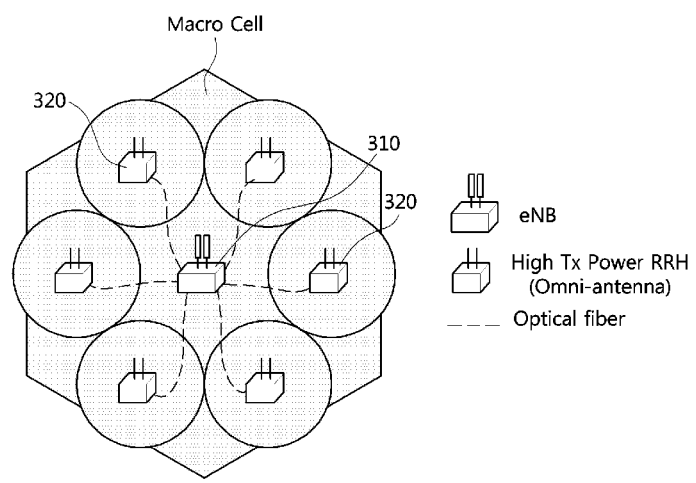
FIG. 3 is a conceptual diagram illustrating CoMP scenarios 3 and 4.

FIG. 1 is a conceptual diagram illustrating CoMP scenario 1, FIG. 2 is a conceptual diagram illustrating CoMP scenario 2, and FIG. 3 is a conceptual diagram illustrating CoMP scenarios 3 and 4.

CoMP scenario 1 is a homogeneous network constituted of only base stations (eNBs) 110 as illustrated in FIG. 1, and a CoMP coordination area is limited to a plurality of cells 111, 112, and 113 within the same base station 110.

CoMP scenario 2 is a homogeneous network constituted of a base station 210 and high power RRHs 220 as illustrated in FIG. 2, and all cells formed by the base station 210 and the high power RRHs 220 becomes CoMP coordination areas. In CoMP scenario 2, the base station 210 and the high power RRHs 220 may be connected to each other via an optical fiber.

CoMP scenarios 3 and 4 are heterogeneous networks in which a plurality of low power RRHs 320 are located within a macro cell formed by a base station 310 as illustrated in FIG. 3. All cells formed by the low power RRHs 320 constitute a CoMP coordination area. In CoMP scenarios 3 and 4, the base station 310 and the low power RRHs 320 may be connected to each other through an optical cable.

Because cells constituting the CoMP coordination area in CoMP scenarios 1, 2, and 3 have different cell IDs, a CRS, a downlink control channel, and a PDSCH are independently transmitted in each cell.

On the other hand, because a low power RRH has the same cell ID as the macro cell in CoMP scenario 4, the CRS, the downlink control channel, and a CRS-based PDSCH may be transmitted using two methods. The first method is a method in which TPs (for example, base stations) and RRH TPs within the macro cell simultaneously transmit signals using the same resource. The second method is a method in which only some TPs within the macro cell transmit signals and the remaining RRH TPs do not perform any transmission through relevant resources used by some TPs within the macro cell (muting).

On the other hand, because a DM-RS-based PDSCH may be transmitted according to each terminal, the TPs and/or the RRH TPs of the macro cell may transmit different data to a plurality of terminals using the same resource when an influence of interference is not large. Here, a DM-RS is transmitted from the same TP as that from which the PDSCH is transmitted.

A CoMP measurement set is constituted of one or more NZP CSI-RS resources. The base station notifies the terminal of configuration information of each CSI-RS resource belonging to the CoMP measurement set. In general, one CSI-RS resource corresponds to one TP. That is, each TP periodically transmits NZP CSI-RSs corresponding to its own used antenna ports.

Figure 4:
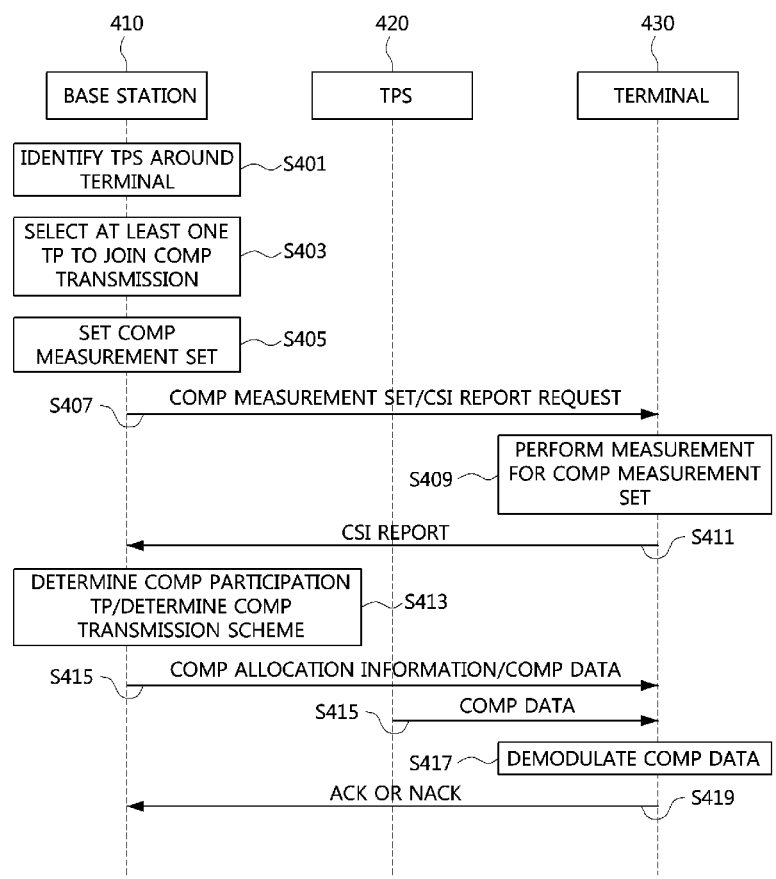
FIG. 4 is a flowchart illustrating a process in which a base station sets a CoMP measurement set.

FIG. 4 is a flowchart illustrating a process in which a base station sets a CoMP measurement set.

Referring to FIG. 4, first, the base station 410 identifies TPs 420 around a terminal 430 (S401) and selects at least one candidate TP 420 that is likely to join CoMP transmission for the terminal 430 (S403).

Thereafter, the base station 410 enables the terminal 430 to set CSI-RS resources transmitted by the candidate TPs 420 as a CoMP measurement set of the terminal 430 (S405). Here, the base station 410 may set the CoMP measurement set according to each terminal 430 for CoMP execution and request each terminal 430 to report CSI for the CoMP measurement set (S407).

When information about the CoMP measurement set and the CSI report request for the CoMP measurement set are received from the base station 410, each terminal 430 performs measurement for the CoMP measurement set (S409) and consequently transmits the CSI to the base station 410 (S411). That is, the CoMP measurement set is a set constituted of CSI-RS resources corresponding to TPs serving as a CSI measurement target.

The base station 410 determines a TP (that is, a CoMP transmission set) which joins the CoMP transmission based on a CoMP measurement report received from the terminal 430 and a CoMP transmission scheme (S413), and transmits data along with CoMP assignment information to the terminal 430 (S415). At this time, one or more CoMP TPs 420 included in the CoMP transmission set may transmit CoMP data to the terminal 430.

After demodulating the CoMP data (S417), the terminal 430 transmits an acknowledgement (ACK) or negative ACK (NACK) signal indicating whether the demodulation has succeeded to the base station 410 (S419).

PDSCH RE Mapping Signaling

When JP CoMP is used in CoMP scenarios 1, 2, and 3, a size of a downlink control area may be different between neighboring cells. Accordingly, the base station needs to provide a notification of a position of an orthogonal frequency division multiplexing (OFDM) symbol in which PDSCH mapping starts through RRC signaling or prescribe a position of the OFDM symbol in which PDSCH mapping starts in a standard. In this case, the terminal may determine that signaling occurs regardless of a size of a control area of a cell in which the terminal is located or a neighboring cell or PDSCH mapping occurs from a position defined in the standard.

In addition, when JP CoMP is used in CoMP scenarios 1, 2, and 3, a PDSCH RE of a predetermined cell joining transmission may collide with a CRS RE of another cell joining transmission due to different CRS pattern settings (the number of CRS ports and a frequency shift) between neighboring cells because TPs form different cells.

In particular, in the case of JT in JP CoMP, cells joining the transmission transmit the same data using the same resource and a contaminated RE may occur due to a collision between a CRS RE and a PDSCH RE of different cells. In this case, the number of joining TPs is reduced due to the contaminated RE. That is, when a resource in which the contaminated RE has occurred is compared with a resource constituted of normal REs without a collision, the number of TPs is different and therefore artificial interference occurs in PDSCH demodulation. This is because channels estimated by a DM-RS (which is also referred to as a UE-specific RS) generated under the assumption that all TPs joins the transmission do not match channels created by TPs joining actual transmission in the contaminated RE. In order to solve the above-described problem, the base station may configure a PDSCH channel using the remaining REs excluding contaminated REs and transmit data on the PDSCH channel to the terminal.

In addition, in the case of DPS of JP CoMP, data may be transmitted using the remaining REs excluding a relevant CRS RE only when the base station notifies the terminal of CRS pattern information of a cell in which actual transmission is performed.

On the other hand, because there is no CRS RE in an area in which the PDSCH is transmitted in the case of an MBSFN subframe, the terminal may know PDSCH RE mapping from MBSFN subframe configuration information only when the terminal knows the MBSFN subframe configuration information of the TPs.

As described above, the base station needs to notify the terminal of REs through which no PDSCH is transmitted to the terminal so as to exclude an RE or REs corresponding to a specific CRS pattern or CRS patterns in both JT CoMP and DPS CoMP from data transmission.

Quasi Co-Location of CSI-RS and DM-RS (UE-Specific RS)

When the terminal knows CSI-RS resource information for a CSI-RS used by the TP joining the transmission of the PDSCH transmitted in a specific subframe and the terminal is able to receive the CSI-RS, the terminal may more correctly perform channel estimation for PDSCH demodulation and improve PDSCH reception performance through such channel estimation.

If two antenna ports are quasi co-located, this means that large scale properties of a data symbol transmitted from one antenna port may be inferred from a channel of a data symbol transmitted from the other antenna port.

For example, assuming that the CSI and the DM-RS are quasi co-located, relevant large-scale properties may include at least one of delay spread, Doppler spread, Doppler shift, average gain, and average delay of a radio channel.

When the terminal knows a CSI-RS resource quasi co-located with the DM-RS, it is possible to estimate information about a power delay profile, timing, or the like of a radio channel in which the PDSCH is transmitted from the CSI- RS and more correctly estimate a channel than when the channel estimation is performed using the DM-RS transmitted along with the PDSCH through such information estimation. That is, when the terminal knows the CSI-RS quasi co-located with the DM-RS, it is possible to more correctly perform channel estimation.

Accordingly, it is preferable that the base station notify the terminal of information about a CSI-RS resource to be used by at least one TP joining the PDSCH transmission. Because TPs joining the PDSCH transmission may be different for every subframe as described above, the base station may dynamically notify the terminal of CSI-RS resource information associated with the PDSCH transmission using a physical downlink control channel (PDCCH) or enhanced PDCCH (EPDCCH) used for PDSCH scheduling.

Hereinafter, a method of performing signaling in which RRC signaling is combined with DCI signaling for signaling associated with RE mapping of the PDSCH and signaling associated with quasi co-location of the CSI-RS and the DM-RS (or UE-specific RS) when the terminal receives a PDSCH (that is, DM-RS-based PDSCH) to be demodulated using the DM-RS will be described.

Signaling Method Using RRC and DCI

When the total number of NZP CSI-RS resources belonging to a CoMP measurement set for the terminal is $S_M (\leq 3)$, the CoMP measurement set M may be expressed as shown in Math 1.

$$M=\{CSI\text{-}RS_O, \ldots, CSR\text{-}RS_{S_M-1}\} \quad \text{Math 1}$$

In Math 1, CSI-RS; (i=0, . . . , $S_M$–1) denotes an NZP CSI-RS resource belonging to the CSI-RS measurement set.

Figure 5:
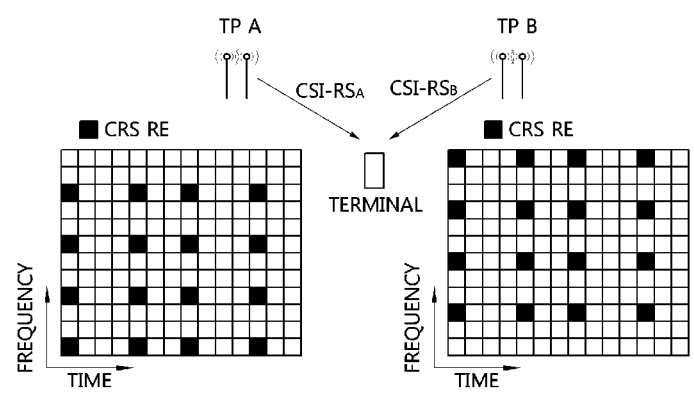
FIG. 5 is a conceptual diagram illustrating CSI-RS transmissions of TPs and positions of CRS REs within a resource block in a CoMP transmission environment.

FIG. 5 is a conceptual diagram illustrating CSI-RS transmissions of TPs and positions of CRS REs within a resource block in a CoMP transmission environment.

Referring to FIG. 5, a first TP A and a second TP B belong to a CoMP coordination set of the terminal, the first TP A transmits $CSI\text{-}RS_A$ to the terminal, and the second TP B transmits $CSI\text{-}RS_B$ to the terminal.

On the other hand, as illustrated in FIG. 5, positions of REs through which a CRS is transmitted may be different between the first TP A and the second TP B. Accordingly, the terminal should know CRS configuration information of each TP so as to demodulate PDSCHs transmitted from the first TP A and the second TP B normally.

The base station may set the following information for each CSI-RS resource belonging to the CoMP measurement set for the terminal through RRC signaling. Here, the terminal may assume that the CRS and MBSFN information are the same as configuration information of the serving cell of the terminal with respect to a CSI-RS resource for which the following configuration information is not provided. The terminal may acquire the number of CRS ports of a serving cell to which the terminal belongs, a frequency shift of a CRS RS, and MBSFN subframe information from a physical broadcasting channel (PBCH) broadcast within a cell, a synchronization signal, system information, and the like.

Information Set for Each CSI-RS Resource

The number of CRS ports: 1, 2, or 4

Frequency shift of a CRS RE

MBSFN subframe configuration information: information about subframes designated as MBSFN subframes ZP CSI-RS resource configuration information Here, in the case of ZP CSI-RS resource configuration information, the base station delivers ZP CSI-RS configuration information associated with a corresponding CSI-RS resource to the terminal through terminal-specific RRC signaling.

Figure 6:
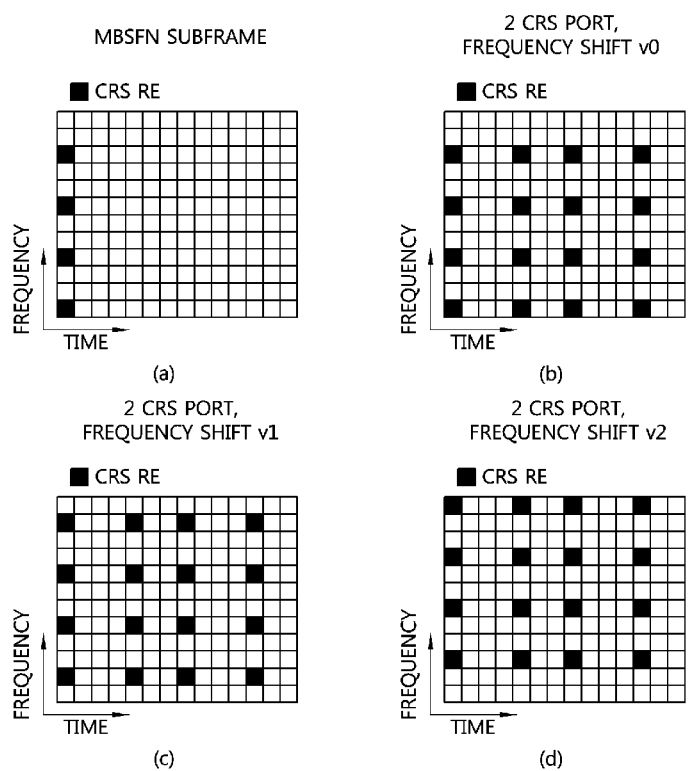
FIG. 6 is a conceptual diagram illustrating positions of CRS REs within a resource block.

FIG. 6 is a conceptual diagram illustrating positions of CRS REs within a resource block.

In FIG. 6, (a) illustrates a CRS-RE position of an MBSFN subframe, (b) illustrates a CRS-RE position when the number of CRS ports is 2 and a frequency shift is v0. In addition, (c) illustrates a CRS-RE position when the number of CRS ports is 2 and a frequency shift is v1 and (d) illustrates a CRS-RE position when the number of CRS ports is 2 and a frequency shift is v2.

In FIG. 6, positions of CRS REs illustrated in (c) are shifted upward by one subcarrier on a frequency axis from symbols in which CRS REs are positioned as compared with positions of CRS REs illustrated in (b).

In FIG. 6, positions of CRS REs illustrated in (d) are shifted upward by two subcarriers on the frequency axis from symbols in which CRS REs are positioned as compared with positions of CRS REs illustrated in (b).

The base station defines the following four CSI-RS resource sets through RRC signaling.

CSI-RS resource set 1

CSI-RS resource set 2

CSI-RS resource set 3

CSI-RS resource set 4

A CSI-RS resource set is a set constituted of CSI-RS resources, and the CSI-RS resources may be selected for CSI-RS resources belonging to the CoMP measurement set of the terminal.

In addition, a DCI control filed for signaling information about PDSCH RE mapping and/or quasi co-location of the CSI-RS and the DM-RS is configured within a DCI.

The DCI control field may be constituted of a 2-bit length, and is configured by associating 2-bit control field values with the four CSI-RS resource sets set through RRC signaling as described above as shown in Table 1.

TABLE 1

| DCI control field value | CSI-RS resource set |
|---|---|
| 00 | CSI-RS resource set 1 |
| 01 | CSI-RS resource set 2 |
| 10 | CSI-RS resource set 3 |
| 11 | CSI-RS resource set 4 |

On the other hand, it is preferable that each CSI-RS resource set illustrated in Table 1 be configured to have CSI-RS resources belonging to a CoMP measurement set of the terminal as described above as elements. For example, in the case for executing DPS CoMP, CSI-RS resource sets may be set as follows because only one TP transmits a signal at one time.

CSI-RS resource set 1=$\{CSI\text{-}RS_0\}$

CSI-RS resource set 2=$\{CSI\text{-}RS_1\}$

CSI-RS resource set 2=$\{CSI\text{-}RS_2\}$

Alternatively, in the case for executing JT CoMP, CSI-RS resource sets may be set as follows because one or more TPs may transmit signals.

CSI-RS resource set 1=$\{CSI\text{-}RS_0\}$

CSI-RS resource set 2=$\{CSI\text{-}RS_0, CSI\text{-}RS_1\}$

CSI-RS resource set 3=$\{CSI\text{-}RS_0, CSI\text{-}RS_2\}$

CSI-RS resource set 4=$\{CSI\text{-}RS_0, CSI\text{-}RS_1, CSI\text{-}RS_2\}$

Because the CSI-RS resource sets are set according to each terminal through RRC signaling, the base station may set the CSI-RS resource sets in consideration of a channel state of the terminal and a CoMP scheme to be applied to the terminal.

On the other hand, CSI-RS resource set 1 among the above-described four CSI-RS resource sets can be fixedly set as a first CSI-RS resource set of a CoMP measurement set. That is, a method of defining CSI-RS resource set 1={CSI-RS$_0$} in the standard and setting only the remaining CSI-RS resource sets through RRC signaling is available.

Among the above-described information for each CSI-RS resource, a variable $V_{shift}$ defined in the 3GPP LTE standard is available as a frequency shift of a CRS RE. According to the 3GPP LTE standard, a frequency shift of a CRS port is determined by a physical layer cell identity (PCI) and a total of six frequency shifts are possible. Accordingly, in a cell in which one CRS port is used, a total of six different CRS resource mapping patterns may be generated. On the other hand, in a cell in which two CRS ports are used, a total of three different CRS resource mapping patterns may be generated by six frequency shifts. In addition, in a cell in which four CRS ports are used, a total of three different CRS resource mapping patterns may be generated by the six frequency shifts.

PDSCH REs are constituted of REs excluding REs used by the PDCCH and the EPDCCH arranged in a front part of a subframe. Accordingly, the terminal should know the REs used by the PDCCH and the EPDCCH in advance and it should be understood that the REs used by the PDCCH and the EPDCCH do not correspond to PDSCH REs.

In addition, the terminal should interpret that the PDSCH REs are mapped for a resource domain in which the EPDCCH, the CRS, and the DM-RS (or UE-specific RS) among REs subsequent to an OFDM symbol in which the PDSCH starts are not transmitted.

In addition, it is preferable that the base station notify the terminal of resource configuration information of an NZP CSI-RS and a ZP-CSI-RS and exclude REs corresponding to the NZP CSI-RS and the ZP CSI-RS from PDSCH RE mapping.

'MBSFN-SubframeConfig' which is a parameter defined in the 3GPP LTE standard may be used as MBSFN subframe configuration information among the above-described information set for each CSI-RS resource. According to the 3GPP LTE standard, the MBSFN subframe configuration information is provided using an RRC parameter of 'MBSFN-SubframeConfig.' Content to be provided through the above parameter is as follows.

Radio frame allocation period (radioframeAllocatioPeriod): this is set as 1, 2, 4, 8, 16, or 32 radio frames and a period in which an MBSFN subframe is allocated is indicated as a radio frame time unit.

Radio frame allocation offset (radioframeAllocationOffset): this is an integer of 0 to 7.

On the other hand, radio frame including MBSFN subframes are radio frames satisfying the following Math 2.

SFN(SystemFrameNumber)mod radioframeAllocatio
   Period=radioframeAllocationOffset     Math 2

The base station may notify the terminal of whether there is an MBSFN subframe in units of subframes using the following subframe allocation (subframeAllocation) information for radio frames including the MBSFN subframe.

Subframe Allocation

One frame: it is indicated whether subframes #1, #2, #3, #6, #7, and #8 are MBSFN subframes in the form of a bit map in the case of frequency division duplex (FDD) using 6 bits.

Four frames: it is indicated whether subframes #1, #2, #3, #6, #7, and #8 in each radio frame are MBSFN subframes in the form of a bit map in units of four radio frames continuous in time in the case of FDD using 24 bits.

When a predetermined subframe corresponds to an MBSFN subframe, there is no CRS in a region in which the PDSCH is transmitted. However, in the case of a subframe (that is, a non-MBSFN subframe) which does not correspond to an MBSFN subframe, there is a CRS in the region in which the PDSCH is transmitted.

The terminal may demodulate the PDSCH using the mapping information only when a method in which a PDSCH resource allocated to the terminal is mapped to a time-space domain is known. Because CRS REs are excluded from the PDSCH RE mapping, the base station should perform necessary signaling so that the terminal may know positions of REs occupied by the CRS in a subframe in which the PDSCH is transmitted.

The terminal may receive a control field value associated with information about PDSCH RE mapping and/or quasi co-location of the CSI-RS and the DM-RS through a DCI and know CSI-RS resources belonging to a CSI-RS resource set corresponding to the received control field value.

In addition, the terminal may assume that signaled CSI-RS resources and the DM-RS associated with the PDSCH are quasi co-located. That is, the terminal assumes that TPs corresponding to the signaled CSI-RS resources join PDSCH transmission. The terminal considers a CSI-RS, which is transmitted through CSI-RS resources belonging to a CSI-RS resource set designated by the DCI control field value shown in Table 1, to be quasi co-located with the DM-RS associated with the PDSCH and may perform channel estimation using the CSI-RS quasi co-located with the DM-RS.

Because the terminal knows MBSFN subframe configuration information of each of TPs associated with CSI-RS resources, the number of CRS ports, resource mapping information, NZP CSI-RS and ZP CSI-RS configuration information, and the like from information set through RRC signaling in advance as described above, it is possible to know PDSCH RE mapping in every PDSCH transmission based on such information.

Hereinafter, DCI formats to be applied to control information signaling for CoMP transmission according to an example embodiment of the present invention will be described.

DCI Formats

In an example embodiment of the present invention, it is assumed that DCI formats available for PDSCH scheduling of a terminal set in transmission mode 10 are DCI formats 1A and 2D. Here, pre-coding which is not based on a codebook capable of supporting a maximum of 8 layers is used in transmission mode 10. Transmission mode 10 is a transmission mode to be used for CoMP.

The following Table 2 indicates a PDCCH search space available according to each DCI format in the case of the PDCCH (or EPDCCH) and the PDSCH set by a C-RNTI, and Table 3 indicates a PDCCH search space available according to each DCI format in the case of the PDCCH (or EPDCCH) and the PDSCH set by an SPS C-RNTI.

TABLE 2

| Transmission mode | DCI format | Search space |
|---|---|---|
| 10 | DCI format 1A | Common search space (CSS) and UE-specific search space (USS) |
|  | DCI format 2D | USS |

TABLE 3

| Transmission mode | DCI format | Search space |
|---|---|---|
| 10 | DCI format 1A<br>DCI format 2D | CSS and USS<br>USS |

[Consideration of Size Problem of DCI Format]

The DCI format 1A is a format obtained by correcting the DCI format 1A of the existing 3GPP LTE standard, Release 10, and the base station may perform transmission after selecting one search space between a CSS in which the terminal should monitor the PDCCH (or EPDCCH) and a USS.

When the DCI format 1A is transmitted in the CSS so that the number of PDCCH blind detections of the terminal does not increase, it is preferable that the DCI format 1A be configured to have the same information size as a DCI format 0, a DCI format 3, and a DCI format 3A. Accordingly, a DCI control field associated with information about PDSCH RE mapping and/or quasi co-location of the CSI-RS and the DM-RS is not added to the DCI format 1A to be transmitted in the CSS.

[Consideration of Fallback Support for Resetting Transmission Mode]

When the DCI format 1A is transmitted in the USS, the base station may add the DCI control field associated with the information about the PDSCH RE mapping and/or the quasi co-location of the CSI-RS and the DM-RS. When the DCI control field is added in this manner, a size should be adjusted so that the DCI format 0 and the DCI format 1A have the same information size as each other by performing zero padding so that the DCI format 0 also has the same information size (payload size) as the DCI format 1A.

However, it is preferable that the DCI format 1A have the same information size regardless of the transmission mode because the DCI format 1A is a format commonly available in all transmission modes in consideration of ambiguity of DCI format detection while a transmission mode change is made.

Accordingly, it is not preferable to add a new control field for transmission mode 10. In order to support a fallback operation for a transmission mode resetting time, the information about the PDSCH RE mapping of the PDSCH scheduled according to the DCI format 1A and the quasi co-location of the CSI-RS and the DM-RS should also be the same regardless of the transmission mode so that ambiguity does not occur for the transmission mode change time.

According to the above description, the DCI control filed associated with the information about the PDSCH RE mapping and/or the quasi co-location of the CSI-RS and the DM-RS is not added to the DCI format 1A when the CRC of the DCI format 1A is scrambled by a C-RNTI or SPS-RNTI and the DCI format 1A is transmitted in the CSS. Alternatively, even when the CRC of the DCI format 1A is scrambled by the C-RNTI or SPS-RNTI and transmitted in the USS, the DCI control filed associated with the information about the PDSCH RE mapping and/or the quasi co-location of the CSI-RS and the DM-R is not added.

On the other hand, the DCI format 2D may be transmitted in only the USS. The DCI format 2D is a new DCI format created by adding the above-described DCI control field used for signaling of the information about the PDSCH RE mapping and/or the quasi co-location of the CSI-RS and the DM-RS to the existing DCI format 2C. In order to prevent the number of PDCCH blind detections of the terminal from increasing, it is necessary to configure DCI having the same information size regardless of whether the RNTI for scrambling the CRC is the C-RNTI or SPS-RNTI. Accordingly, the information size of the DCI format 2D is configured to be the same regardless of a type of used RNTI.

According to the above description, the CRC of the DCI format 2D is scrambled by the C-RNTI or SPS-RNTI and the DCI format 2D is transmitted in the USS. In addition, the DCI format 2D may include a control field associated with the information about the PDSCH RE mapping and the quasi co-location of the CSI-RS and the DM-RS.

As described above, the DCI format 1A does not include a new DCI control field. On the other hand, the DCI format 2D may include the new DCI control field because the DCI format 2D is transmitted in only the USS.

[Case of PDSCH Scheduled by DCI Format 2D in which CRC is Scrambled by C-RNTI]

In the case of the PDCCH (or EPDCCH) and the PDSCH set by the C-RNTI, the CRC of the DCI is scrambled by the C-RNTI and dynamic scheduling for scheduling the PDSCH using every PDCCH (or EPDCCH) is performed. In this case, the base station may notify the terminal of CSI-RS resource information associated with at least one TP joining PDSCH transmission of the terminal by including the control field associated with the information about the PDSCH RE mapping and/or the quasi co-location of the CSI-RS and the DM-RS in the DCI format 2D to be transmitted in the USS.

That is, the DCI control field used for signaling of the information about the PDSCH RE mapping and/or the quasi co-location of the CSI-RS and the DM-RS may be set by the C-RNTI and included in the DCI format 2D to be transmitted in the USS.

[Whether to Add Control Field Associated with Information about PDSCH RE Mapping and/or Quasi Co-Location of CSI-RS and DM-RS to DCI Format 2D is Set by RRC]

There may be a terminal which does not support a CoMP operation among terminals set to transmission mode 10. A terminal capable of supporting the CoMP operation also needs to transmit the PDSCH using only one TP without using CoMP transmission for a relatively long time.

In the above-described case, there is an advantage in that the downlink overhead may be reduced when the control field associated with the information about the PDSCH RE mapping and/or the quasi co-location of the CSI-RS and the DM-RS is not added to the DCI format 2D.

Accordingly, it is preferable to introduce RRC configuration information for notifying the terminal of whether to add the control field associated with the information about the PDSCH RE mapping and/or the quasi co-location of the CSI-RS and the DM-RS to the DCI format 2D.

The terminal may determine whether to add the control field associated with the information about the PDSCH RE mapping and/or the quasi co-location of the CSI-RS and the DM-RS through the above-described RRC configuration information. That is, the terminal determines that the above-described control field is added to the DCI only when the control field is set to be added in the RRC configuration information. Here, when the number of CSI-RS resources belonging to the CoMP measurement set is one, a method in which the control field indicating the information about the PDSCH RE mapping and/or the quasi co-location of the CSI-RS and the DM-RS is not added to the DCI format 2D is also available.

When the field associated with the information about the PDSCH RE mapping and/or the quasi co-location of the CSI-RS and the DM-RS is not added, the base station should provide the terminal with the information about the PDSCH RE mapping and/or the quasi co-location of the CSI-RS and the DM-RS using only RRC configuration information. In this case, the base station may enable the terminal to acquire the information about the PDSCH RE mapping and/or the quasi co-location of the CSI-RS and the DM-RS using the following RRC information corresponding to one TP.

The number of CRS ports: 1, 2, or 4
Frequency shift of CRS RE
MBSFN subframe configuration information
NZP CSI-RS resource configuration information
ZP CSI-RS resource configuration information Among the above-described RRC information, the number of CRS ports, the frequency shift of the CRS RE, and the MBSFN subframe configuration information may be defined to be constantly the same as configuration information of the serving cell of the terminal. In this case, only the NZP CSI-RS resource configuration information and the ZP CSI-RS resource configuration information may be provided to the terminal through RRC signaling.

According to the above description, when the information about the PDSCH RE mapping and/or the quasi co-location of the CSI-RS and the DM-RS is not included in the DCI format 2D for scheduling the PDSCH, the information should be defined in the standard or the base station should signal the information to the terminal in advance through RRC setting.

In particular, the NZP CSI-RS resource configuration information may be set as the same information as information to be applied to the PDSCH scheduled according to the DCI format 1A in which the CRC is scrambled by the C-RNTI.

However, it is preferable that the ZP CSI-RS resource configuration information be configured as different information separate from information to be applied to the PDSCH scheduled according to the DCI format 1A in which the CRC is scrambled by the C-RNTI and the fallback operation is supported. This is because the PDSCH scheduled according to the DCI format 2D is based on the DM-RS and the support of the fallback operation is unnecessary in the case of the DCI format 2D.

Hereinafter, the reason the ZP CSI-RS resource configuration information is separately configured to be applied to each of the case of PDSCH transmission in which it is necessary to support the fallback operation and the case of DM-RS-based PDSCH transmission in which it is not necessary to support the fallback operation when the ZP CSI-RS resource configuration information is set will be described.

In general, ZP CSI-RS resource setting is performed to prevent resources used for NZP CSI-RS transmission by TPs around a TP A from being used as data resources at the TP A when other TPs are located around the TP A. Alternatively, in order to set an interference measurement resource for a CoMP feedback of the terminal, it is general to set a corresponding resource, which is set as the ZP CSI-RS resource, as the NZP CSI-RS resource.

However, when the base station generally uses a CSR-based transmission scheme in CoMP scenario 4, the terminal may demodulate the PDSCH using the CRS normally only when all TPs joining the CRS transmission among TPs belonging to a macro cell join PDSCH transmission using the same resource.

On the other hand, each TP should not use REs corresponding to its own NZP CSI-RS and ZP CSI-RS for the PDSCH transmission. Accordingly, REs excluded from RE mapping of the PDSCH based on the CRS should include NZP CSI-RS transmission resources and ZP CSI-RS transmission resources of all TPs joining CRS-based PDSCH transmission.

Differently from the above description, TPs joining the PDSCH transmission may be selected in DM-RS-based PDSCH transmission and it is only necessary to set a ZP CSI-RS in consideration of only the CSI-RS transmission resources and the ZP CSI-RS transmission resources to be used by the selected TPs. However, in the case of the DM-RS-based PDSCH, TPs joining the DM-RS-based PDSCH transmission are generally less in number than TPs joining the CRS-based PDSCH transmission.

Accordingly, TPs associated with the ZP CSI-RS resources for PDSCH RE mapping of CRS-based transmission may be generally different from TPs associated with the ZP CSI-RS resources for PDSCH RE mapping of DM-RS-based transmission.

In particular, only one TP may join the DM-RS-based PDSCH transmission. In this case, it is only necessary to provide the terminal with only NZP CSI-RS resource configuration information and ZP CSI-RS resource configuration information to be used by a corresponding TP.

When the above description is considered, it is preferable for the base station to provide the terminal with signaling for ZP CSI-RS REs excluded from PDSCH resource mapping in the case of CRS-based transmission and ZP CSI-RS REs excluded from PDSCH resource mapping in the case of DM-RS-based transmission using pieces of separate configuration information distinguished from each other.

On the other hand, when the terminal set to transmission mode 10 receives the DM-RS-based PDSCH and the received PDSCH is scheduled according to DCI in which the fallback operation is not required, it is preferable that NZP CSI-RS and ZP CSI-RS resource information for use in PDSCH RE mapping become information about CSI-RS resources used by TPs joining actual PDSCH transmission. In this case, it is preferable that the base station provide NZP CSI-RS and ZP CSI-RS configuration information through separate terminal-specific RRC signaling different from the case of the fallback operation.

However, when the terminal receives the PDSCH scheduled according to the DCI format 1A in which the CRC is scrambled by the C-RNTI, the same NZP CSI-RS and ZP CSI-RS resource configuration information should be applied to all transmission modes regardless of the PDSCH transmission scheme (CRS-based transmission or DM-RS-based transmission) so as to support the fallback operation. Accordingly, when the fallback operation is supported, ZP CSI-RS resource configuration information set in the CRS-based transmission method should also be equally applied to the DM-RS-based transmission method.

Even when transmission modes are different when the same CSI-RS configuration information is used as described above, it is possible to perform a fallback operation in which ambiguity of PDSCH resource mapping does not occur for a transmission mode resetting time.

Specifically, information set in the 3GPP LTE standard, Release 10, is available as PDSCH RE mapping information of a terminal set to transmission mode 10 as will be described below.

That is, NZP CSI-RS configuration information provided as a parameter csi-RS-r10 among CSI-RS-Config information elements defined in the 3GPP LTE standard, Release 10, may be applied as NZP CSI-RS configuration information of the terminal set to transmission mode 10 and ZP CSI-RS configuration information provided as zeroTxPowerCSI- RS-r10 defined in the standard may be applied as ZP CSI-RS configuration information of the terminal set to transmission mode 10.

In other words, when the PDSCH transmission for the terminal set to transmission mode 10 is scheduled according to the DCI format 1A in which the CRC is scrambled by the C-RNTI, the PDSCH RE mapping may be configured to be determined using CSI-RS configuration information provided as CSI-RS-Config information elements which are RRC configuration information of the standard of Release 10 as configuration information for PDSCH RE mapping. On the other hand, in the case of the DM-RS-based transmission, a CSI-RS resource quasi co-located with the DM-RS may be defined as an NZP CSI-RS resource included in the CSI-RS-Config information elements of the standard of Release 10.

When a new parameter (for example, csi-RS-r11) for providing the NZP CSI-RS configuration information is defined in the 3GPP LTE standard, Release 11, NZP CSI-RS configuration information provided as the new parameter (for example, csi-RS-r11) among the CSI-RS-Config information elements of the 3GPP LTE standard, Release 11, may be applied as NZP CSI-RS configuration information of the terminal set to transmission mode 10 and ZP CSI-RS configuration information provided as a newly defined parameter (for example, zeroTxPowerCSI-RS-r11) in Release 11 may be applied as ZP CSI-RS configuration information of the terminal set to transmission mode 10.

That is, when the PDSCH transmission for the terminal set to transmission mode 10 is scheduled according to the DCI format 1A in which the CRC is scrambled by the C-RNTI, the PDSCH RE mapping may be configured to be determined using CSI-RS configuration information provided as CSI-RS-Config information elements which are RRC configuration information of the 3GPP LTE standard, Release 11, as configuration information for PDSCH RE mapping. In the case of the DM-RS-based transmission, a CSI-RS resource having quasi co-location may also be defined as an NZP CSI-RS resource included in the CSI-RS-Config information elements of Release 11.

On the other hand, because the PDSCH scheduled according to the DCI format 2D in which the CRC is scrambled by the C-RNTI is a DM-RS-based PDSCH and the fallback operation support is unnecessary, it is preferable to apply separate ZP CSI-RS resource configuration information different from the ZP CSI-RS configuration information for supporting the fallback operation.

[Case of PDSCH Scheduled According to DCI Format 1A in which CRC is Scrambled by C-RNTI]

Because information about the PDSCH RE mapping and/or the quasi co-location of the CSI-RS and the DM-RS is not included as described above when the PDSCH scheduled according to the DCI format 1A in which the CRC is scrambled by the C-RNTI supports the fallback operation, it is necessary to define an operation associated with the information in the standard or set the information through separate RRC signaling as will be described below.

First, the terminal assumes that PDSCH resource mapping is constantly performed based on CRS configuration information, MBSFN information, CSI-RS resource configuration information, and the like of a service cell to which the terminal belongs.

That is, it is assumed that the terminal conforms to the PDSCH resource mapping of the serving cell. This is to eliminate ambiguity of the PDSCH resource mapping for a transmission mode resetting time. Here, when the CSI-RS resource configuration information has been scheduled according to the DCI format 1A, the terminal should receive the setting of the CSI-RS resource configuration information from the base station through terminal-specific RRC signaling. On the other hand, ambiguity of the PDSCH resource mapping does not occur for a transmission mode resetting time only when the same CSI-RS resource configuration information to be applied in all transmission modes for the fallback support is applied to the PDSCH resource mapping.

Here, the CRC of the DCI format 1A is scrambled by the C-RNTI, the PDSCH scheduled according to the DCI format 1A may be the DM-RS-based PDSCH or the CRS-based PDSCH. In both the DM-RS-based PDSCH and the CRS-based PDSCH, PDSCH RE mapping using the same CSI-RS configuration information should be applied.

Specifically, configuration information provided as CSI-RS-Config information elements defined in the 3GPP LTE standard, Release 10, may be used as NZP CSI-RS configuration information and ZP CSI-RS configuration information. When a new parameter (for example, csi-RS-r11) is defined in the 3GPP LTE standard, Release 11, NZP CSI-RS configuration information provided as the new parameter (for example, csi-RS-r11) among CSI-RS-Config information elements defined in the 3GPP LTE standard, Release 11, may be applied as NZP CSI-RS configuration information of a PDSCH scheduled according to the DCI format 1A in which the CRC is scrambled by the C-RNTI. In addition, ZP CSI-RS configuration information provided as a new parameter (for example, zeroTxPowerCSI-RS-r11) among the CSI-RS-Config information elements defined in the LTE standard, Release 11, may be applied as ZP CSI-RS configuration information.

When the same CSI-RS configuration information is used for both the DM-RS-based PDSCH and the CRS-based PDSCH scheduled according to the DCI format 1A as described above, ambiguity of PDSCH resource mapping does not occur for a transmission mode resetting time even when transmission modes are different from each other. Here, a CRS-based transmission scheme is a scheme using antenna port No. 0 or a transmit diversity transmission scheme as described in the LTE standard. In the case of transmission mode 9, the CRS-based PDSCH transmission is used when the CRC of the DCI is scrambled by the C-RNTI and the PDSCH is transmitted in a non-MBSFN subframe. Even in the case of transmission mode 10, the CRS-based PDSCH transmission is available when the CRC of the DCI is scrambled by the C-RNTI and the PDSCH is transmitted in the non-MBSFN subframe.

On the other hand, when the PDSCH scheduled according to the DCI format 1A is a DM-RS-based PDSCH with respect to quasi co-location information of the CSI-RS and the DM-RS, the quasi co-location information of the CSI-RS and the DM-RS is necessary. In particular, because a plurality of CSI-RS resources may be set within cells having the same cell ID in the case of CoMP scenario 4, the base station should signal relevant information through RRC configuration information so that the terminal may know a CSI-RS resource associated with a TP actually joining transmission, that is, a CSI-RS resource associated with transmission of a CSI-RS quasi co-located with the DM-RS (or UE-specific RS). Here, the CSI-RS transmitted in the NZP CSI-RS resource included in the CSI-RS-Config information elements used for resource mapping of the PDSCH may be defined to be quasi co-located with the DM-RS (or UE-specific RS). As another method, one of CSI-RS resources belonging to the CoMP measurement set may be designated. For example, a first CSI-RS resource among the CSI-RS resources belonging to the CoMP measurement set may be designated as a CSI-RS resource quasi co-located with the DM-RS. When the above-described information is not provided, the terminal may be configured to consider a CSI-RS resource having the same cell ID as a physical layer cell ID of a serving cell to which the terminal belongs among the CSI-RS resources belonging to the CoMP measurement set as configuration information as a CSI-RS resource used for transmission of the CSI-RS quasi co-located with the DM-RS (or UE-specific RS).

[Case of PDSCH Semi-Persistently Scheduled According to DCI Format 1A in which CRC is Scrambled by SPS C-RNTI]

In the case of the PDSCH semi-persistently scheduled according to the DCI format 1A in which the CRC is scrambled by the SPS C-RNTI, the fallback operation is not necessarily supported.

Hereinafter, operations of the base station and the terminal in the case of the PDSCH semi-persistently scheduled according to the DCI format 1A in which the CRC is scrambled by the SPS C-RNTI will be described.

First, the terminal assumes that PDSCH resource mapping is constantly performed based on CRS configuration information, MBSFN information, CSI-RS resource configuration information, and the like of a service cell to which the terminal belongs when the fallback operation is supported. For quasi co-location information of the CSI-RS and the DM-RS, NZP CSI resources included in the CSI-RS resource configuration information are defined to be quasi co-located with the DM-RS. Here, the CSI-RS resource configuration information should be the same as CSI-RS resource configuration information applied to a PDSCH scheduled according to the DCI format 1A in which the CRC is scrambled by the C-RNTI. Specifically, configuration information provided as the CSI-RS-Config information elements of the LTE standard, Release 10, is available as NZP and ZP CSI-RS configuration information. When a new parameter (for example, csi-RS-r11) is defined in the LTE standard, Release 11, NZP CSI-RS configuration information provided as the newly defined parameter (for example, csi-RS-r11) among CSI-RS-Config information elements defined in the LTE standard, Release 11, may be provided as NZP CSI-RS configuration information of a PDSCH semi-persistently scheduled according to the DCI format 1A in which the CRC is scrambled by the SPS-RNTI. ZP CSI-RS configuration information provided as a newly defined parameter (for example, zeroTxPowerCSI-RS-r11) in the LTE standard, Release 11, may be applied as ZP CSI-RS configuration information of the PDSCH semi-persistently scheduled according to the DCI format 1A in which the CRC is scrambled by the SPS C-RNTI.

On the other hand, when no fallback operation is supported, the base station may provide the terminal with CRS configuration information, MBSFN information, and CSI-RS resource configuration information through separate RRC signaling. The PDSCH resource mapping is performed by applying information set through RRC signaling as described above, and quasi co-location information of the CSI-RS and the DM-RS indicates that NZP CSI resources included in the CSI-RS resource configuration information are quasi co-located with the DM-RS. One of CSI-RS resources belonging to the CoMP measurement set may be designated for the quasi co-location information of the CSI-RS and the DM-RS. For example, a first CSI-RS resource among the CSI-RS resources belonging to the CoMP measurement set may be designated as a CSI-RS resource for use in the transmission of the CSI-RS quasi co-located with the DM-RS (or UE-specific RS). When the above-described information is not provided, the terminal may be configured to consider a CSI-RS resource having the same cell ID as a physical layer cell ID of a serving cell to which the terminal belongs among the CSI-RS resources belonging to the CoMP measurement set as configuration information as a CSI-RS resource used for transmission of the CSI-RS quasi co-located with the DM-RS (or UE-specific RS).

[Case of PDSCH Semi-Persistently Scheduled According to DCI Format 2D in which CRC is Scrambled by SPS C-RNTI]

In the case of the PDCCH (or EPDCCH) and the PDSCH set by an SPS C-RNTI, the PDSCH is allocated by SPS. As in the case in which the CRC of the DCI is scrambled by the C-RNTI, signaling for relevant information to the terminal may be performed as signaling using a combination of the above-described RRC and DCI by including a control field associated with the information about the PDSCH RE mapping and/or the quasi co-location of the CSI-RS and the DM-RS in the DCI format 2D for SPS activation to be transmitted in a USS.

In the case of the PDSCH particularly allocated by SPS (that is, when the CRC of the DCI is scrambled by the SPS C-RNTI) as another method, the terminal may be configured to ignore any case of DCI having a DCI control field associated with the information about the PDSCH RE mapping and/or the quasi co-location of the CSI-RS and the DM-RS regardless of whether the search space in which the DCI is transmitted is a CSS or USS. That is, the terminal ignores the above-described DCI control field associated with the information about the PDSCH RE mapping and/or the quasi co-location of the CSI-RS and the DM-RS in the case of the PDCCH (or EPDCCH) and the PDSCH set by the SPS C-RNTI, and may be configured to operate in a scheme described below.

The terminal assumes that PDSCH resource mapping is constantly performed based on CRS configuration information, MBSFN information, CSI-RS resource configuration information, and the like of a service cell to which the terminal belongs for a PDSCH scheduled by a SPS scheme. That is, it is assumed that the terminal conforms to the PDSCH resource mapping of the serving cell. The PDSCH scheduled according to the SPS scheme is a DM-RS-based PDSCH. Here, the terminal should receive the setting of the CSI-RS resource configuration information from the base station through terminal-specific RRC signaling.

When no fallback operation is supported in the case of the DCI format 1A, it is preferable to configure the CSI-RS resource configuration information as information separate from information applied to the PDSCH scheduled according to the DCI format 1A in which the CRC is scrambled by the C-RNTI. However, when the fallback operation is supported, the CSI-RS resource configuration information should be the same as information to be applied to the PDSCH scheduled according to the DCI format 1A in which the CRC is scrambled by the C-RNTI. In this case, specifically, configuration information provided as the CSI-RS-Config information elements defined in the LTE standard is scheduled according to the DCI format 1A and is available as NZP CSI-RS and ZP CSI-RS configuration information of the PDSCH for supporting the fallback operation. When a new parameter (for example, csi-RS-r11) is defined in the LTE standard, Release 11, NZP CSI-RS configuration information provided as the newly defined parameter (for example, csi-RS-r11) among the CSI-RS-Config information elements of the LTE standard, Release 11, may be applied as NZP CSI-RS configuration information and ZP CSI-RS configuration information provided as a newly defined parameter (for example, zeroTxPowerCSI-RS-r11) may be applied as ZP CSI-RS configuration information.

Because the support of the fallback operation is unnecessary in the case of the DCI format 2D, it is preferable to configure the CSI-RS resource configuration information as information separate from information applied to the PDSCH scheduled according to the DCI format 1A in which the CRC is scrambled by the C-RNTI.

Because the PDSCH scheduled according to the SPS scheme is a DM-RS-based PDSCH, quasi co-location information of the CSI RS and the DM-RS is necessary. Accordingly, the CSI-RS transmitted in the CSI-RS resource included in the CSI-RS-Config information elements set as described above may be defined to be quasi co-located with the DM-RS (or UE-specific RS). As another method, one of CSI-RS resources belonging to the CoMP measurement set may be designated. For example, a first CSI-RS resource among the CSI-RS resources belonging to the CoMP measurement set may be designated as a CSI-RS resource used for transmission of a CSI-RS resource quasi co-located with the DM-RS. When the above-described information is not provided, the terminal may be configured to consider a CSI-RS resource having the same cell ID as a physical layer cell ID of a serving cell to which the terminal belongs among the CSI-RS resources belonging to the CoMP measurement set as configuration information as a CSI-RS resource used for transmission of the CSI-RS quasi co-located with the DM-RS (or UE-specific RS).

Tables 4 and 5 show the summary of the above-described content. Table 4 shows a signaling method for a PDCCH (or EPDCCH) and a PDSCH set by the C-RNTI and Table 5 shows a signaling method for a PDCCH (or EPDCCH) and a PDSCH set by the SPS C-RNTI. The CSI-RS resource configuration information may be divided into CSI-RS resource configuration information for supporting the fallback operation and CSI-RS resource configuration information to be used when the support of the fallback operation is unnecessary. In particular, it is necessary to discriminate and set ZP CSI resource information.

TABLE 4

| Transmission mode | DCI format | Search space | Information about PDSCH RE mapping and/or quasi co-location of CSI-RS and DM-RS |
|---|---|---|---|
| 10 | DCI format 1A | CSS and USS | Information about PDSCH RE mapping and/or quasi co-location of CSI-RS and DM-RS is provided through RRC setting CSI-RS-Config information elements of LTE standard, Release 10 or 11, are applied as CSI-RS configuration information for supporting fallback operation |
|  | DCI format 2D | USS | When information about PDSCH RE mapping and/or quasi co-location of CSI-RS and DM-RS is not included, above information is provided through RRC setting. In particular, ZP CSI-RS configuration information is provided separately from case of above fallback operation support. When information about PDSCH RE mapping and/or quasi co-location of CSI-RS and DM-RS is included, information is provided through combination of RRC setting and DCI signaling. In particular, ZP CSI-RS configuration information is provided separately from case of fallback operation support, selected by DCI, and provided according to each CSI-RS resource. |

TABLE 5

| Transmission mode | DCI format | Search space | Information about PDSCH RE mapping and/or quasi co-location of CSI-RS and DM-RS |
|---|---|---|---|
| 10 | DCI format 1A | CSS and USS | Information about PDSCH RE mapping and/or quasi co-location of CSI-RS and DM-RS is provided through RRC setting CSI-RS-Config information elements of LTE standard, Release 10 or 11, are applied as CSI-RS configuration information for supporting fallback operation When no fallback operation is supported, NZP CSI-RS and ZP CSI-RS configuration information is provided. In particular, ZP CSI-RS configuration information is provided separately from case of above fallback support. |
|  | DCI format 2D | USS | When information about PDSCH RE mapping and/or quasi co-location of CSI-RS and DM-RS is not used and included in DCI, above information is provided through RRC setting. In particular, ZP CSI-RS configuration information is provided separately from case of above fallback operation support. When information about PDSCH RE mapping and/or quasi co-location of CSI-RS and DM-RS is used and included in DCI, information is provided through combination of RRC setting and DCI signaling. In particular, ZP CSI-RS configuration information is provided separately from case of fallback support, selected by DCI, and provided according to each CSI-RS resource. |

[Application of CSI-RS Resource Configuration Information According to Whether Fallback Operation is Supported]

In the case of the PDCCH (or EPDCCH) and PDSCH set by the C-RNTI in transmission mode 9 according to the existing LTE standard, Release 10, CRS-based PDSCH transmission is used when the PDSCH is scheduled in a non-MBSFN subframe and DM-RS-based PDSCH transmission is used when the PDSCH is scheduled in an MBSFN subframe according to the DCI format 1A transmitted in a USS or CSS.

A transmission scheme as in transmission mode 9 is available even in transmission mode 10. Although it is assumed that the PDSCH transmission scheduled according to the DCI format 1A constantly supports the fallback operation in the case of the PDCCH (or EPDCCH) and the PDSCH set by the C-RNTI in the above description, a method of preventing the fallback operation from being supported in the case of the DM-RS-based PDSCH is available when the reduction of resource use efficiency according to the support of the fallback operation is considered. In the case of the PDCCH (or EPDCCH) and PDSCH set by the C-RNTI, DM-RS-based PDSCH transmission is used when the PDSCH is scheduled in the MBSFN subframe according to the DCI format 1A transmitted in the USS or CSS. In this case, no fallback operation is supported. That is, the fallback operation is supported only in the case of the CRS-based PDSCH. When the fallback operation is supported as described above, NZP CSI-RS and ZP CSI-RS resource configuration information provided as CSI-RS-Config information elements of the LTE standard, Release 10 or 11, is available. On the other hand, when no fallback operation is supported, NZP CSI-RS and ZP CSI-RS resource configuration information should be separately provided. Although the same NZP CSI-RS resource as when the fallback operation is supported is available, it is preferable that ZP CSI-RS configuration information separate from when the fallback operation is supported be set as the ZP CSI-RS resource configuration information.

On the other hand, in the case of the PDCCH (or EPDCCH) and PDSCH set by the C-RNTI in transmission mode 10 for more efficient resource utilization, the DCI format 1A transmitted in the USS may be configured to enable DM-RS-based PDSCH transmission to be used when the PDSCH is scheduled in the non-MBSFN subframe. At this time, antenna port 7 is available as a DM-RS port to be used. In addition, in this case, it is preferable that CSI-RS configuration information for PDSCH RE mapping and/or quasi co-location of the CSI-RS/DM-RS be provided as RRC configuration information to the terminal and ZP CSI-RS resource information be applied to the PDSCH RE mapping by providing the ZP CSI-RS resource information as information separate from ZP CSI-RS information for fallback support (that is, ZP CSI-RS information set by CSI-RS-Config information elements of the LTE standard, Release 10 or 11). Further, when the same ZP CSI-RS configuration information as described above is applicable even when the DCI format 1A is transmitted in the USS and the PDSCH is scheduled in the MBSFN subframe using the DCI format 1A (that is, the case of the DM-RS-based PDSCH transmission). Because the number of resources occupied by the ZP-CSI-RS is relatively less than that in the existing PDSCH transmission for supporting the fallback operation when the configuration is made as described above, there is an advantage in which more resource are available in the PDSCH transmission. However, no fallback operation is supported in the case of the DM-RS-based PDSCH transmission. That is, when the above-described method is used, the DCI format 1A is transmitted in the CSS in the case of the PDCCH (or EPDCCH) and PDSCH set by the C-RNTI and the CRS-based PDSCH transmission is performed only when the PDSCH is scheduled in the non-MBSFN subframe. Only in this case, the ZP CSI-RS information (that is, ZP CSI-RS information set by the CSI-RS-Config information elements of the LTE standard, Release 10) for the fallback support is applied to the PDSCH RE mapping and the fallback operation is supported.

[CSI-RS Setting of LTE Standard, Release 11]

An example in which NZP CSI-RS and ZP CSI-RS resource configurations set by CSI-RS-Config information elements defined in the LTE standard, Release 10, are applicable for information about PDSCH RE mapping of the PDSCH for supporting the fallback operation and quasi co-location has been described above.

However, because initialization of sequence generation of the NZP CSI-RS among the CSI-RS-Config information defined in the LTE standard, Release 10, is performed by a cell ID value when the above-described scheme is used, there is a problem in that a CSI-RS sequence based on a cell ID is forced to be used even for terminals which support the LTE standard, Release 11.

In order to solve the aforementioned problem, a sequence generated using a virtual cell ID may be configured to be used as a CSI-RS sequence in separate CSI-RS configuration information of Release 11 to be applied to the terminals for supporting the LTE standard, Release 11. In addition, PDSCH RE mapping may be configured to be determined in consideration of whether the feedback of the terminal is based on CSI-RS measurement or CRS measurement for more efficient resource utilization.

CSI-RS configuration information of the LTE standard, Release 11, is CSI-RS-Config-r11 and ZP CSI-RS-Config-B-r11 including NZP CSI-RS resource information and ZP CSI-RS resource information. When the information about the PDSCH RE mapping and quasi co-location is not provided to the terminal through the DCI through signaling, the information about the PDSCH RE mapping and quasi co-location is found from relevant configuration information received through signaling when the terminal receives the following CSI-RS configuration information of Release 11 through signaling. This setting method corresponds to a type of default setting method to be used when DCI signaling is not provided to the terminal.

CSI-RS Configuration Information of Release 11
CSI-RS-Config-r11
NZP CSI-RS-Config-r11
ZP CSI-RS-Config-A-r11
ZP CSI-RS-Config-B-r11

Among the above-described CSI-RS configuration information of Release 11, NZP CSI-RS-Config-r11 may be configured to include the number of antenna ports (one of 1, 2, 4, and 8 is designated as in a parameter antennaPorts-Count-r10 defined in the standard of Release 10), CSI-RS resource configuration information (indicating a CSI-RS resource position within the subframe as in a parameter resourceConfig-r10 defined in the standard of Release 10), subframe configuration information (indicating a subframe in which a CSI-RS is transmitted as in a parameter resourceConfig-r10 defined in the standard of Release 10), a parameter indicating an energy per RE (EPRE) ratio between a PDSCH RE and a CSI-RS RE as a parameter p-C-r10 defined in the standard of Release 10, and a virtual cell ID (an ID used instead of a cell ID for CSI-RS sequence generation initialization) as NZP CSI-RS resource configuration information. The terminal assumes that the DM-RS is quasi co-located with the CSI-RS to be transmitted through an NZP CSI-RS resource described in the above-described configuration information only when a PDSCH is only based on the CSI-RS measurement feedback and DM-RS demodulation. On the other hand, in the case of a PDSCH based on the CRS measurement feedback and DM-RS demodulation, the terminal does not assume that the DM-RS is quasi co-located with the CSI-RS to be transmitted through the NZP CSI-RS resource described in the above-described configuration information. Instead, in the case of the PDSCH based on the CRS measurement feedback and the DM-RS demodulation, the terminal may assume that the CRS is quasi co-located with the DM-RS.

Among the above-described CSI-RS configuration information of Release 11, ZP CSI-RS-Config-A-r11 may be configured to include information (in which the same information format as that of a parameter zeroTxPowerResourceConfigList-10 of Release 10) indicating a position of a ZP CSI-RS resource within a subframe as in Release 10 and subframe configuration information (in which subframe information in which there is an ZP CSI-RS and the same format as that of a parameter zeroTxPowerSubframeConfig-r10 of Release 10 is used) as ZP CSI-RS resource configuration information to be applied to PDSCH RE mapping of the PDSCH based on the CSI-RS measurement feedback and DM-RS demodulation.

Among the above-described CSI-RS configuration information of Release 11, ZP CSI-RS-Config-B-r11 is the same as ZP CSI-RS-Config-A-r11 in terms of a format of parameters configuring information as ZP CSI-RS resource configuration information to be applied to PDSCH RE mapping of the PDSCH based on the CRS measurement feedback and DM-RS demodulation and the PDSCH based on the CRS demodulation.

Here, the terminal assumes that the number of CRS ports necessary for the PDSCH RE mapping, a frequency shift of the CRS RE, and MBSFN subframe configuration information are the same as settings of a serving cell of the terminal.

In addition, the transmission of the PDSCH "based on the CSI-RS measurement feedback and DM-RS demodulation" described above means transmission in which feedback of the terminal is performed through CSI-RS measurement and PDSCH demodulation is performed using a DM-RS (or UE-specific RS). In addition, the transmission of the PDSCH "based on the CRS measurement feedback and the DM-RS demodulation" described above means transmission in which feedback of the terminal is performed through CRS measurement and the DM-RS is used for PDSCH demodulation. In addition, the transmission of the PDSCH "based on the CRS demodulation" described above means transmission in which the CRS is used for PDSCH demodulation.

Even when the DM-RS is used for PDSCH demodulation, TPs joining CRS transmission also join PDSCH transmission because the PDSCH transmission by the base station is performed based on feedback information of the terminal when the feedback of the terminal is performed based on CRS measurement.

Accordingly, NZP CSI-RS resources and ZP CSI-RS resources used by all TPs joining the CRS transmission as in the case of the PDSCH based on the CRS demodulation should be excluded from the PDSCH RE mapping.

On the other hand, in the case of the PDSCH transmission based on the CSI-RS measurement feedback and DM-RS demodulation, a TP (or TPs) joining the PDSCH transmission may be generally different from TPs joining the CRS transmission. In particular, this corresponds to CoMP scenario 4. Because of this, it is preferable to enable different ZP CSI-RS configuration information to be set by distinguishing the case of the PDSCH based on the CSI-RS measurement feedback and DM-RS demodulation from the case of the PDSCH based on the CRS measurement feedback and DM-RS or CRS demodulation as described above.

The terminal of Release 11 may be set to any one of transmission modes 1, 2, 3, 4, 5, 6, 7, 8, 9, and 10. It is preferable that the terminal of Release 11 determine PDSCH RE mapping and quasi co-location from the above-described CSI-RS configuration information of Release 11 when the PDCCH (or EPDCCH) and the PDSCH are set by the SPS-C-RNTI or C-RNTI and information about the PDSCH RE mapping and quasi co-location is not provided through DCI with respect to all the transmission modes.

Tables 6, 7, 8, and 9 show a transmission mode and a search space and a PDSCH transmission scheme according to a DCI format for the PDCCH and PDSCH set by the C-RNTI and the SPS C-RNTI, respectively, as content described in the LTE standard, Release 10.

TABLE 6

| Transmission mode | DCI format | Search Space | Transmission scheme of PDSCH corresponding to PDCCH |
| --- | --- | --- | --- |
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4)or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |

TABLE 7

| Transmission mode | DCI format | Search Space | Transmission scheme of PDSCH corresponding to PDCCH |
| --- | --- | --- | --- |
| Mode 7 | DCI format 1A | Common and UE specific by C-RNTI | If the number of PBCH antenna ports is one, Single-antenna port, port 0 is used (see sublclause 7.1.1), otherwise Transmit diversity (see subclause 7.1.2) |
| | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see sublclause 7.1.1), otherwise Transmit diversity (see subclause 7.1.2) |

TABLE 7-continued

| Transmission mode | DCI format | Search Space | Transmission scheme of PDSCH corresponding to PDCCH |
|---|---|---|---|
| | DCI format 2B | UE specific by C-RNTI | Dual layer transmission, port 7 and 8 (see subclause 7.1.6A) or single-antenna port, port 7 or 8 (see subclause 7.1.1) |
| Mode 9 | DCI format 1A | Common and UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2C | UE specific by C-RNTI | Up to 8 layer transmission, ports 7-14 (see subclause 7.1.6B) or single-antenna port, port 7 or 8 (see subclause 7.1.1) |

TABLE 8

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Transmit diversity (see subclause 7.1.2) |

TABLE 9

| Transmission mode | DCI format | Search Space | Transmission scheme of PDSCH corresponding to PDCCH |
|---|---|---|---|
| Mode 5 | DCI format 1A | Common and UE specific by C-RNTI | Transmit diversity (see subclause 7.1.2) |
| Mode 6 | DCI format 1A | Common and UE specific by C-RNTI | Transmit diversity (see subclause 7.1.2) |
| Mode 7 | DCI format 1A | Common and UE specific by C-RNTI | Single-antenna port, port 5 (see subclause 7.1.1) |
| | DCI format 1 | UE specific by C-RNTI | Single-antenna port, port 5 (see subclause 7.1.1) |

TABLE 9-continued

| Transmission mode | DCI format | Search Space | Transmission scheme of PDSCH corresponding to PDCCH |
|---|---|---|---|
| Mode 8 | DCI format 1A | Common and UEspecificbyC-RNTI | Single-antenna port, port 7 (see subclause 7.1.1) |
| | DCI format 2B | UE specific by C-RNTI | Single-antenna port, port 7 or 8 (see subclause 7.1.1) |
| Mode 9 | DCI format 1A | Common and UEspecificbyC-RNTI | Single-antenna port, port 7 (see subclause 7.1.1) |
| | DCI format 2C | UE specific by C-RNTI | Single-antenna port, port 7 or 8, (see subclause 7.1.1) |

Hereinafter, content associated with PDSCH RE mapping and quasi co-location according to each transmission mode for the terminal of Release 11 in the case of the PDCCH and PDSCH set by the C-RNTI and SPS C-RNTI in the LTE standard, Release 11, will be described.

Because a PDSCH transmission scheme (that is, based on CRS demodulation) in which demodulation is performed by a CRS is used in transmission modes 1, 2, 3, 4, 5, and 6, ZP CSI-RS-Config-B-r11 should be applied to PDSCH RE mapping.

In the case of the C-RNTI, transmission mode 7 is a mode in which a PDSCH scheduled according to the DCI format 1A is subjected to CRS demodulation-based PDSCH transmission and a PDSCH scheduled according to the DCI format 1 is demodulated using DM-RS (or UE-specific RS) antenna port 5, but the feedback of the terminal is classified as PDSCH transmission based on the CRS measurement feedback and DM-RS demodulation because the feedback of the terminal is performed through CRS measurement. In the case of the SPS C-RNTI, transmission mode 7 is a mode in which demodulation is performed using the DM-RS, but the feedback of the terminal is classified as transmission based on CRS measurement feedback and DM-RS demodulation because the feedback of the terminal is performed through CRS measurement. Accordingly, in transmission mode 7, ZP CSI-RS-Config-B-r11 should be applied to PDSCH RE mapping.

Because PDSCH transmission based on CRS demodulation and PDSCH transmission based on CRS measurement feedback and DM-RS demodulation are used even in transmission mode 8, ZP CSI-RS-Config-B-r11 should be applied to PDSCH RE mapping in transmission mode 8.

In transmission mode 9, CSI-RS-Config-B-r11 should be applied to PDSCH RE mapping because a PDSCH scheduled in a non-MBSFN subframe by the DCI format 1A is subjected to PDSCH transmission based on CRS demodulation (in which antenna port 0 or transmit diversity is used) in the case of the C-RNTI.

In transmission mode 9, a PDSCH scheduled in the MBSFN subframe by the DCI format 1A and a PDSCH scheduled according to the DCI format 2C are demodulated using a DM-RS (or UE-specific RS) in the case of the C-RNTI and PDSCHs scheduled according to the DCI formats 1A and 2C are also demodulated using the DM-RS in the case of the SPS C-RNTI. Although the PDSCH is demodulated using the DM-RS, the base station is configured to select one of a scheme of generating CSI feedback of the terminal from CRS measurement and a scheme of generating the CSI feedback of the terminal from CSI-RS measurement. More specifically, the feedback of the terminal is generated and reported by measuring a CSI-RS when a parameter pmi-RI-Report is set, and the feedback of the terminal is generated and reported by measuring a CRS when pmi-RI-Report is not set. Accordingly, it is preferable that the feedback be classified as transmission based on CSI-RS measurement feedback and DM-RS demodulation and ZP CSI-RS-Config-A-r11 be applied to PDSCH RE mapping when the parameter pmi-RI-Report is set and the feedback be classified as transmission based on CRS measurement feedback and DM-RS demodulation and ZP CSI-RS-Config-B-r11 be applied to PDSCH RE mapping when pmi-RI-Report is not set. When the terminal is allowed to assume quasi co-location among CRS, CSI-RS, and DM-RS signals in transmission mode 9, the PDSCH RE mapping should be determined using the ZP CSI-RS-Config-B-r11 because all TPs which transmit the CRS, CSI-RS, and DM-RS should match.

Even in transmission mode 10, as in transmission mode 9, it is preferable to apply ZP CSI-RS-Config-B-r11 to PDSCH RE mapping in CRS demodulation-based PDSCH transmission for performing demodulation using a CRS, apply ZP CSI-RS-Config-A-r11 to the PDSCH RE mapping because the PDSCH transmission for performing demodulation using a DM-RS is PDSCH transmission based on CSI-RS measurement feedback and DM-RS modulation when the parameter pmi-RI-Report is set, and apply ZP CSI-RS-Config-B-r11 to the PDSCH RE mapping because the PDSCH transmission is PDSCH transmission based on CRS measurement feedback and DM-RS demodulation when pmi-RI-Report is not set. In the case of transmission mode 10 in the standard of Release 11, a new rule may be defined so that feedback based on CSI-RS measurement is provided even when pmi-RI-Report is not set. Because this case corresponds to PDSCH transmission based on CSI-RS measurement feedback and DM-RS demodulation even when pmi-RI-Report is not set, it is preferable to apply the ZP CSI-RS-Config-A-r11 to the PDSCH RE mapping. However, in the case of the PDSCH to be scheduled according to a DCI format for supporting a fallback operation, it is possible to use ZP CSI-RS-Config-B-r11.

The following Tables 10 and 11 show operations associated with PDSCH RE mapping and/or quasi co-location of the CSI-RS/DM-RS when CSI-RS configuration information of the LTE standard, Release 11, is introduced. Table 10 shows the case of the PDCCH (or EPDCCH) and PDSCH set by the C-RNTI and Table 11 shows the case of the PDCCH (or EPDCCH) and PDSCH set by the SPS C-RNTI.

TABLE 10

| Transmission mode | DCI format | Search space | Information about PDSCH RE mapping and/or quasi co-location of CSI-RS/DM-RS |
|---|---|---|---|
| 10 | DCI format 1A | CSS and USS | Information about PDSCH RE mapping and/or quasi co-location of CSI-RS/DM-RS is provided through following RRC setting. Following information is applied as CSI-RS configuration information according to PDSCH transmission scheme among CSI-RS configuration information of LTE standard, Release 11. When PDSCH transmission is based on CSI-RS measurement feedback and DM-RS demodulation and no fallback operation is supported, NZP CSI-RS-Config-r11 and ZP CSI-RS-Config-A-r11 are applicable. In the case of PDSCH transmission for supporting fallback operation, ZP CSI-RS-Config-B-r11 is applicable, there is no information about quasi co-location of CSI-RS and DM-RS, and terminal assumes that there is quasi co-location among CRS, CSI-RS, and DM-RS. |
| | DCI format 2D | USS | When information about PDSCH RE mapping and/or quasi co-location of CSI-RS/DM-RS is not included, above information is provided through following RRC setting. Following information among CSI-RS configuration information of LTE standard, Release 11, is applied as CSI-RS configuration information. In case of PDSCH transmission based on CSI-RS measurement feedback and DM-RS demodulation, NZP CSI-RS-Config-r11 and ZP CSI-RS-Config-A-r11 are applicable. In case of PDSCH transmission based on CRS measurement feedback and DM-RS demodulation or PDSCH transmission based on CRS demodulation, ZP CSI-RS-Config-B-r11 is applicable, there is no information about quasi co-location of CSI-RS and DM-RS, and terminal assumes that there is quasi co-location among CRS, CSI-RS, and DM-RS. When information about PDSCH RE mapping and/or quasi co-location of CSI-RS/DM-RS is included in DCI, information is provided through combination of RRC setting and DCI signaling and ZP CSI-RS configuration information is selected by DCI and dynamically provided to terminal. |

TABLE 11

| Transmission mode | DCI format | Search space | Information about PDSCH RE mapping and/or quasi co-location of CSI-RS/DM-RS |
|---|---|---|---|
| 10 | DCI format 1A | CSS and USS | Information about PDSCH RE mapping and/or quasi co-location of CSI-RS/DM-RS is provided through following RRC setting. Among CRS configuration information of LTE standard, Release 11, following information is applied as CSI-RS configuration information. |

TABLE 11-continued

| Transmission mode | DCI format | Search space | Information about PDSCH RE mapping and/or quasi co-location of CSI-RS/DM-RS |
|---|---|---|---|
| | DCI format 2D | USS | When PDSCH transmission is based on CSI-RS measurement feedback and DM-RS demodulation and no fallback operation is supported, NZP CSI-RS-Config-r11 and ZP CSI-RS-Config-A-r11 are applicable. When fallback operation is applied, ZP CSI-RS-Config-B-r11 is applicable, there is no information about quasi co-location of CSI-RS and DM-RS, and terminal assumes that there is quasi co-location among CRS, CSI-RS, and DM-RS. When information about PDSCH RE mapping and/or quasi co-location of CSI-RS/DM-RS is not included in DCI, above information is provided through following RRC setting. Following information among CSI-RS configuration information of LTE standard, Release 11, is applied as CSI-RS configuration information. In case of PDSCH transmission based on CSI-RS measurement feedback and DM-RS demodulation, NZP CSI-RS-Config-r11 and ZP CSI-RS-Config-A-r11 are applicable. In case of PDSCH transmission based on CRS measurement feedback and DM-RS demodulation or PDSCH transmission based on CRS demodulation, ZP CSI-RS-Config-B-r11 is applicable, there is no information about quasi co-location of CSI-RS and DM-RS, and terminal assumes that there is quasi co-location among CRS, CSI-RS, and DM-RS. When information about PDSCH RE mapping and/or quasi co-location of CSI-RS/DM-RS is included in DCI, information is provided through combination of RRC setting and DCI signaling and ZP CSI-RS configuration information is selected by DCI and dynamically provided to terminal. |

Hereinafter, operations of the base station and the terminal when information about PDSCH RE mapping and quasi co-location is not dynamically provided through DCI will be additionally described.

[Use of ZP CSI-RS Resource Configuration Information According to Whether Fallback Operation is Supported]

Hereinafter, a situation in which the terminal may assume quasi co-location among CRS, CSI-RS, and DM-RS signals in all transmission modes 1 to 9 is considered. In this case, because TPs which transmit the CRS, CSI-RS, and DM-RS should match, PDSCH RE mapping should be determined using ZP CSI-RS-Config-B-r11 in all transmission modes 1 to 9.

In the case of transmission mode 10, a rule is assumed to be defined so that the terminal provides a CSI measurement-based feedback even when pmi-RI-report is not set. According to this assumption, it is preferable that ZP CSI-RS-Config-A-r11 be used in PDSCH transmission in which no fallback operation is supported and ZP CSI-RS-Config-B-r11 be used in PDSCH transmission in which the fallback operation is supported in the case of transmission mode 10.

According to the existing LTE standard, Release 10, in the PDCCH and PDSCH set by the C-RNTI in transmission mode 9, CRS demodulation-based PDSCH transmission is used when the PDSCH is scheduled in a non-MBSFN subframe and DM-RS demodulation-based PDSCH transmission is used when the PDSCH is scheduled in an MBSFN subframe according to the DCI format 1A transmitted in the USS or CSS. It is assumed that a transmission scheme of transmission mode 10 is also the same as that of the above-described transmission mode 9.

When the PDSCH scheduled according to the DCI format 1A supports the fallback operation, ZP CSI-RS-Config-B-r11 should be applied to PDSCH RE mapping and the terminal assumes quasi co-location among CRS, CSI-RS, and DM-RS signals.

In the case of the DM-RS demodulation-based PDSCH scheduled according to the DCI format 1A, it is possible to use a scheme which no fallback operation is supported. That is, in the case of the PDCCH (or EPDCCH) and PDSCH set by the C-RNTI, PDSCH transmission based on DM-RS demodulation is used when the PDSCH is scheduled in the MBSFN subframe according to the DCI format 1A transmitted in the USS or CSS. In this case, the terminal applies ZP CSI-RS-Config-A-r11 and assumes quasi co-location between CSI-RS and DM-RS corresponding to NZP CSI-RS-Config-r11.

On the other hand, in the case of the PDCCH (or EPDCCH) and PDSCH set by the C-RNTI in transmission modes 9 and 10 of the LTE standard, Release 11, for more efficient resource utilization, the DCI format 1A transmitted in the USS may be configured to enable the PDSCH transmission based on the DM-RS demodulation to be used when the PDSCH is scheduled in the non-MBSFN subframe. At this time, antenna port 7 is available as a DM-RS port to be used. In this case, because transmission schemes of transmission modes 9 and 10 are different from those of other transmission modes, no fallback operation is supported. The terminal is configured to apply ZP CSI-RS-Config-A-r11 to PDSCH RE mapping because PDSCH transmission is based on CSI-RS measurement feedback and DM-RS demodulation. In the case of the PDCCH (or EPDCCH) and PDSCH set by the C-RNTI, the fallback operation is supported by applying ZP CSI-Config-B-r11 to the PDSCH RE mapping because PDSCH transmission is based on CRS demodulation when the DCI format 1A is transmitted in the CSS and the PDSCH is scheduled in the non-MBSFN subframe.

[Change in NZP CSI-RS-Config-r11 and ZP CSI-RS-Config-A-r11]

In the case of CoMP scenario 4, a TP may change even when a serving cell of the terminal does not change. In this case, the base station should set a change in NZP CSI-RS and ZP CSI-RS resource configuration information for the terminal according to the TP change. While configuration information changes, the base station and the terminal should be able to perform transmission/reception to/from each other based on common interest.

Because a transmission scheme based on the changed CSI-RS resource configuration information causes ambiguity according to a configuration information change, a transmission scheme which does not depend upon the CSI-RS resource configuration information should be used. Because ZP CSI-RS-Config-B-r11 is ZP CSI-RS configuration information considering all TPs within a cell joining CRS transmission, the same information is available without change in spite of a change in NZP CSI-RS-Config-r11 and ZP CSI-RS-Config-A-r11 according to the TP change. Accordingly, it is preferable to use a PDSCH to be scheduled through the DCI format 1A in which the fallback operation is supported for PDSCH transmission and reception without ambiguity for a change time of NZP CSI-RS-Config-r11 and ZP CSI-RS-Config-A-r11. At this time, ZP CSI-RS-Config-B-r11 is applied to PDSCH RE mapping. As described above, it can be seen that ZP CSI-RS-Config-B-r11 which is ZP CSI-RS configuration information considering all TPs within a cell joining CRS transmission is necessary for PDSCH transmission without ambiguity in a configuration information change according to the TP change.

On the other hand, in the case of CoMP scenarios 3, it is unnecessary to change a TP when there is no change in a service cell of the terminal and it is unnecessary to distinguish and separately set ZP CSI-RS-Config-A-r11 and ZP CSI-RS-Config-B-r11 because the number of TPs joining the CRS transmission within the cell is one.

Accordingly, the base station sets ZP CSI-RS-Config-B-r11 only if necessary and the terminal may apply ZP CSI-RS-Config-A-r11 to PDSCH RE mapping instead of ZP CSI-RS-Config-B-r11 when ZP CSI-RS-Config-B-r11 is not set.

Even in CoMP scenario 4, PDSCH transmission is not impossible even when ZP CSI-RS-Config-B-r11 is not used. In this case, the base station and the terminal should assume that PDSCH RE mapping is performed based on ZP CSI-RS-Config-A-r11. In CoMP scenario 4, some TPs may actually transmit an NZP CSI-RS instead of PDSCH transmission in REs corresponding to NZP CSI-RS resources without performing PDSCH transmission in REs corresponding to their own ZP CSI-RS resources. Because relevant information is not provided, there is a problem in that PDSCH reception performance is degraded. In particular, the problem of performance degradation may occur in the case of a PDSCH based on CRS demodulation and a PDSCH based on CRS measurement feedback and DM-RS demodulation.

[Strict Fallback Support Considering Both PDSCH RE Mapping and Quasi Co-Location]

In order to strictly support the fallback operation, it is preferable that both the PDSCH RE mapping scheme and the quasi co-location assumption be equally applied regardless of a transmission mode. This is to efficiently perform PDSCH transmission and reception without performance degradation by eliminating ambiguity between the base station and the terminal while transmission mode resetting is performed.

Accordingly, when the terminal assumes quasi co-location among CRS, CSI-RS, and DM-RS signals in all transmission modes 1 to 9, the terminal should assume quasi co-location among CRS, CSI-RS, and DM-RS signals even in the fallback operation of transmission mode 10.

In particular, for strict fallback support in CoMP scenario 4, a TP or TPs for transmitting CRSs all join CRS transmission using separate NZP CSI-RS resources to CSI-RS ports by applying a transmission scheme such as the same single point transmission scheme as in the CRS transmission or a single frequency network (SFN) scheme and it is necessary to provide a notification to the terminal so that the NZP CSI-RS resources are used for the assumption of a PDSCH RE mapping scheme and quasi co-location. Thereby, the terminal may assume quasi co-location among CSI-RS signals transmitted in the NZP CSI-RS resources indicated by the notification from the base station, CRS signals, and DM-RS signals.

In transmission modes 1 to 9, the terminal may know CSI-RS resources corresponding to quasi co-location among CRS, CSI-RS, and DM-RS signals only when the above-described NZP CSI-RS is set. In transmission modes 1 to 9, the base station notifies the terminal of one NZP CSI-RS setting and one ZP CSI-RS setting through RRC signaling regardless of whether the fallback operation is supported, so that the terminal uses the above-described information as information of PDSCH RE mapping and location information of quasi co-location among CRS, CSI-RS, and DM-RS signals.

On the other hand, in the case of transmission mode 10, different settings may be provided to the terminal by distinguishing the support and non-support of the fallback operation. This will be described in detail below.

In order to strictly support the fallback operation for a terminal set to transmission mode 10, the NZP CSI-RS setting and the ZP CSI-RS setting for use of the fallback support PDSCH should be provided to the terminal through RRC signaling as follows.

CSI-RS-Config-r11-fallback
NZP CSI-RS-Config-B-r11
ZP CSI-RS-Config-B-r11

With respect to a PDSCH for supporting the fallback operation, the terminal should find a CSI-RS to be transmitted in a resource indicated by NZP CSI-RS-Config-B-r11 as a CSI-RS to be applied for the assumption of the quasi co-location of the CRS, CSI-RS, and DM-RS, and it should be understood that REs indicated by NZP CSI-RS-Config-B-r11 and ZP CSI-RS-Config-B-r11 are excluded from PDSCH RE mapping of the PDSCH to be transmitted to the terminal.

As described above, the fallback support PDSCH may be defined in various forms as follows.

[Method 1] PDSCH scheduled according to DCI format 1A

[Method 2] PDSCH scheduled in non-MBSFN subframe using DCI format 1A

[Method 3] PDSCH scheduled using DCI format 1A to be transmitted in CSS

[Method 4] PDSCH scheduled in non-MBSFN subframe using DCI format 1A to be transmitted in CSS In the case of the fallback support PDSCH, the terminal uses NZP CSI-RS and ZP CSI-RS configuration information provided from CSI-RS-Config-r11-fallback as information about PDSCH RE mapping and quasi co-location. By assuming that CRS and MBSFN subframe settings conform to settings of a serving cell of the terminal because of the fallback support PDSCH, PDSCH resource mapping is derived.

For the terminal set so that the information about the PDSCH RE mapping and quasi co-location is not included in the DCI format 2D, separate CSI-RS-Config-r11 information is configured as follows and applied to a non-fallback PDSCH.

CSI-RS-Config-r11
NZP CSI-RS-Config-A-r11
ZP CSI-RS-Config-A-r11

Here, the non-fallback PDSCH includes all PDSCHs excluding the fallback PDSCH defined as described above. The PDSCH scheduled according to the DCI format 2D is constantly a non-fallback PDSCH.

Differently from CoMP scenario 4, in the case of CoMP scenario 3, separate CSI-RS-Config-r11-fallback may not be set for the fallback operation. Accordingly, it is preferable to prevent CSI-RS-Config-r11-fallback from being constantly set. When CSI-RS-Config-r11-fallback is not set, the terminal should commonly apply information included in CSI-RS-Config-r11-fallback to all PDSCHs regardless of whether the fallback operation is supported.

When the information about the PDSCH RE mapping and quasi co-location is included in the DCI format 2D, the terminal finds information about RE mapping of non-fallback PDSCH and quasi co-location according to relevant information. When CSI-RS-Config-r11-fallback information is set, the terminal should apply the set information in the case of the fallback PDSCH. When the CSI-RS-Config-r11-fallback information is not set, the NZP CSI-RS setting and the ZP-CSI-RS setting to be applied in the case of the fallback PDSCH should be provided. It is preferable to provide the NZP CSI-RS setting and the ZP-CSI-RS setting selected from among a plurality of NZP CSI-RS settings and a plurality of ZP CSI-RS settings set by RRC so as to dynamically indicate information about the PDSCH RE mapping and quasi co-location through the DCI format 2D.

In a scheme of applying the above-described information about the PDSCH RE mapping and quasi co-location, the information about the PDSCH RE mapping and quasi co-location is applied to a DPCCH and PDSCH set by a C-RNTI or SPS C-RNTI or applied to an EDPCCH and PDSCH set by a C-RNTI or SPS C-RNTI.

While the example embodiments of the present invention have been described above, those skilled in the art should understand that various changes, substitutions and alterations may be made without departing from the spirit and scope of the invention defined by the following claims.

The invention claimed is:

1. A communication method performed by a user equipment (UE), the method comprising:
   receiving a first message comprising a predetermined number of sets of parameters, each of the predetermined number of sets of parameters comprising information on a location of a zero-power Channel State Information Reference Signal (CSI-RS) and Multicast Broadcast Single Frequency Network (MBSFN) subframe configuration information;
   receiving Downlink Control Information (DCI) on a physical downlink control channel (PDCCH) in a first subframe, wherein the DCI comprises an identifier, consisting of a predetermined number of bits, which indicates a first set of parameters among the predetermined number of sets of parameters;
   determining a first set of radio resources of a physical downlink shared channel (PDSCH) in the first subframe based on the DCI; and
   receiving data using the first set of radio resources of the PDSCH in the first subframe.

2. The method of claim 1, wherein the DCI on the PDCCH is related to semi persistent scheduling (SPS) activation.

3. The method of claim 1, wherein the DCI corresponds to a downlink control information (DCI) format 2D.

4. The method of claim 1, wherein the predetermined number of bits are two (2) bits which indicate one of four sets of parameters.

5. The method of claim 1, wherein the predetermined number of sets of parameters comprise a second set of parameters, the second set of parameters comprises information on another location of another zero-power CSI-RS, and the location of the zero-power CSI-RS is different from the another location of the another zero-power CSI-RS.

6. The method of claim 1, wherein each of the predetermined number of sets of parameters comprise information on a starting Orthogonal Frequency Division Multiplexing (OFDM) symbol.

7. A communication method performed by a base station, the method comprising:
   transmitting a first message comprising a predetermined number of sets of parameters to a user equipment (UE), each of the predetermined number of sets of parameters comprising information on a location of a zero-power Channel State Information Reference Signal (CSI-RS) and Multicast Broadcast Single Frequency Network (MBSFN) subframe configuration information;
   transmitting Downlink Control Information (DCI) on a physical downlink control channel (PDCCH) to the UE in a first subframe, wherein the DCI comprises an identifier, consisting of a predetermined number of bits, which indicates a first set of parameters among the predetermined number of sets of parameters, wherein the first message and the DCI allow the UE to determine a first set of radio resources of a physical downlink shared channel (PDSCH) in the first subframe; and
   transmitting data using the first set of radio resources of the PDSCH to the UE in the first subframe.

8. The method of claim 7, wherein the DCI on the PDCCH is related to semi persistent scheduling (SPS) activation.

9. The method of claim 7, wherein:
   the first set of parameters allows the UE to receive the data, and
   the information, in the first set of parameters, on the location of the zero-power CSI-RS allows the UE to measure the channel conditions.

10. The method of claim 7, wherein each of the predetermined number of sets of parameters comprise information on a starting Orthogonal Frequency Division Multiplexing (OFDM) symbol.

11. A communication apparatus for a user equipment (UE), the apparatus comprising:
   a circuitry,
   wherein the circuitry is configured to:
      cause the UE to receive a first message comprising a predetermined number of sets of parameters, each of the predetermined number of sets of parameters comprising information on a location of a zero-power Channel State Information Reference Signal (CSI-RS) and Multicast Broadcast Single Frequency Network (MBSFN) subframe configuration information;
      cause the UE to receive Downlink Control Information (DCI) on a physical downlink control channel (PDCCH) in a first subframe, wherein the DCI comprises an identifier, consisting of a predetermined number of bits, which indicates a first set of parameters among the predetermined number of sets of parameters;
      cause the UE to determine a first set of radio resources of a physical downlink shared channel (PDSCH) in the first subframe based on the DCI; and
      cause the UE to receive data using the first set of radio resources of the PDSCH in the first subframe.

12. The apparatus of claim 11, wherein the DCI on the PDCCH is related to semi persistent scheduling (SPS) activation.

13. The apparatus of claim 11, wherein the DCI corresponds to a downlink control information (DCI) format 2D.

14. The apparatus of claim 11, wherein the predetermined number of bits are two (2) bits which indicate one of four sets of parameters.

15. The apparatus of claim 11, wherein the predetermined number of sets of parameters comprise a second set of parameters, the second set of parameters comprises information on another location of another zero-power CSI-RS, and the location of the zero-power CSI-RS is different from the another location of the another zero-power CSI-RS.

16. The apparatus of claim 11, wherein each of the predetermined number of sets of parameters comprises information on a starting Orthogonal Frequency Division Multiplexing (OFDM) symbol.

17. A communication apparatus for a base station, the apparatus comprising:
a circuitry,
wherein the circuitry is configured to:
cause the communication apparatus to transmit a first message comprising a predetermined number of sets of parameters to a user equipment (UE), each of the predetermined number of sets of parameters comprising information on a location of a zero-power Channel State Information Reference Signal (CSI-RS) and Multicast Broadcast Single Frequency Network (MBSFN) subframe configuration information;
cause the communication apparatus to transmit Downlink Control Information (DCI) on a physical downlink control channel (PDCCH) to the UE in a first subframe, wherein the DCI comprises an identifier, consisting of a predetermined number of bits, which indicates a first set of parameters among the predetermined number of sets of parameters, wherein the first message and the DCI allow the UE to determine a first set of radio resources of a physical downlink shared channel (PDSCH) in the first subframe; and
cause the communication apparatus to transmit data using the first set of radio resources of the PDSCH to the UE in the first subframe.

18. The apparatus of claim 17, wherein DCI on the PDCCH is related to semi persistent scheduling (SPS) activation.

19. The apparatus of claim 17, wherein:
the first set of parameters allows the UE to receive the data, and
the information, in the first set of parameters, on the location of the zero-power CSI-RS allows the UE to measure the channel conditions.

20. The apparatus of claim 17, wherein each of the predetermined number of sets of parameters comprises information on a starting Orthogonal Frequency Division Multiplexing (OFDM) symbol.

21. A user equipment (UE), comprising:
a circuitry,
wherein the circuitry is configured to:
cause the UE to receive a first message comprising a predetermined number of sets of parameters, each of the predetermined number of sets of parameters comprising information on a location of a zero-power Channel State Information Reference Signal (CSI-RS) and Multicast Broadcast Single Frequency Network (MBSFN) subframe configuration information;
cause the UE to receive Downlink Control Information (DCI) on a physical downlink control channel (PDCCH) in a first subframe, wherein the DCI comprises an identifier, consisting of a predetermined number of bits, which indicates a first set of parameters among the predetermined number of sets of parameters;
cause the UE to determine a first set of radio resources of a physical downlink shared channel (PDSCH) in the first subframe based on the DCI; and
cause the UE to receive data using the first set of radio resources of the PDSCH in the first subframe.

22. The UE of claim 21, wherein the DCI on the PDCCH is related to semi persistent scheduling (SPS) activation.

23. The UE of claim 21, wherein the DCI corresponds to a downlink control information (DCI) format 2D.

24. The UE of claim 21, wherein the predetermined number of bits are two (2) bits which indicate one of four sets of parameters.

25. The UE of claim 21, wherein the predetermined number of sets of parameters comprise a second set of parameters, the second set of parameters comprises information on another location of another zero-power CSI-RS, and the location of the zero-power CSI-RS is different from the another location of the another zero-power CSI-RS.

26. The UE of claim 21, wherein each of the predetermined number of sets of parameters comprises information on a starting Orthogonal Frequency Division Multiplexing (OFDM) symbol.

27. The method of claim 1, wherein determining the first set of radio resources of the PDSCH in the first subframe comprises determining the first set of radio resources based on the location of the zero-power CSI-RS of the first set of parameters.

28. The method of claim 7, wherein the first set of radio resources of the PDSCH in the first subframe is determined based on the information on the location of the zero-power CSI-RS of the first set of parameters.

29. The apparatus of claim 11, wherein the circuitry is further configured to, in determining the first set of radio resources of the PDSCH in the first subframe, determine the first set of radio resources based on the location of the zero-power CSI-RS of the first set of parameters.

30. The apparatus of claim 17, wherein the first set of radio resources of the PDSCH in the first subframe is determined based on the information on the location of the zero-power CSI-RS of the first set of parameters.

31. The UE of claim 21, wherein the circuitry is further configured to, in determining the first set of radio resources of the PDSCH in the first subframe, determine the first set of radio resources based on the location of the zero-power CSI-RS of the first set of parameters.

* * * * *